US008497767B2

(12) United States Patent
Hollis, Jr.

(10) Patent No.: US 8,497,767 B2
(45) Date of Patent: Jul. 30, 2013

(54) MAGNETIC LEVITATION HAPTIC INTERFACE SYSTEM

(75) Inventor: Ralph LeRoy Hollis, Jr., Pittsburgh, PA (US)

(73) Assignee: Butterfly Haptics, LLC, Pittsburgh, PA (US)

( * ) Notice: Subject to any disclaimer, the term of this patent is extended or adjusted under 35 U.S.C. 154(b) by 683 days.

(21) Appl. No.: 12/712,772

(22) Filed: Feb. 25, 2010

(65) Prior Publication Data

US 2011/0050405 A1 Mar. 3, 2011

Related U.S. Application Data

(60) Provisional application No. 61/156,874, filed on Mar. 2, 2009.

(51) Int. Cl.
*H04B 3/36* (2006.01)
*G08B 6/00* (2006.01)

(52) U.S. Cl.
USPC ............. 340/407.1; 340/407.2; 345/161; 273/148 R; 273/148 B; 74/473.3; 74/473.31; 74/473.32; 74/473.35; 74/469; 74/470

(58) Field of Classification Search
None
See application file for complete search history.

(56) References Cited

U.S. PATENT DOCUMENTS

| | | | |
|---|---|---|---|
| 3,061,805 A | 10/1962 | Brodersen | |
| 4,700,094 A | 10/1987 | Downer et al. | |
| 4,874,998 A | 10/1989 | Hollis | |
| 5,146,566 A * | 9/1992 | Hollis et al. | 710/73 |
| 5,382,885 A | 1/1995 | Salcudean et al. | |
| 6,195,083 B1 * | 2/2001 | Salcudean et al. | 345/161 |
| 6,373,466 B2 | 4/2002 | Salcudean et al. | |
| 6,483,499 B1 | 11/2002 | Li et al. | |
| 7,224,252 B2 | 5/2007 | Meadow et al. | |
| 7,336,006 B2 | 2/2008 | Watanane et al. | |
| 8,072,418 B2 * | 12/2011 | Crawford et al. | 345/156 |
| 2001/0052893 A1 * | 12/2001 | Jolly et al. | 345/156 |
| 2005/0024331 A1 * | 2/2005 | Berkley et al. | 345/161 |
| 2006/0209019 A1 * | 9/2006 | Hu | 345/156 |

OTHER PUBLICATIONS

R. L. Hollis and S. E. Salcudean, "Lorentz Levitation Technology: a New Approach to Fine Motion Robotics, Teleoperation, Haptic Interfaces, and Vibration Isolation," *Int'l Symposium for Robotics Research*, Hidden Valley, Pa., Oct. 1-3, 1993.
P. J. Berkelman, Z. B. Butler, and R. L. Hollis, "Design of a Hemispherical Magnetic Levitation Haptic Interface," *ASME Int'l. Mechanical Engineering Congress and Exposition*, Atlanta, Nov. 1996, DSC-vol. 58, pp. 483-488.
P. Berkelman, "A Novel Coil Configuration to Extend the Motion Range of Lorentz Force Magnetic Levitation Devices for Haptic Interaction," Proc. IEEE/RSJ Int'l. Conf. on Intelligent Robots and Systems, San Diego, Oct. 29-Nov. 2, 2007, pp. 2107-2112.
P. J. Berkelman, R. L. Hollis, and S. E. Salcudean, "Interacting with Virtual Environments using a Magnetic Levitation Haptic Interface," *Int'l. Conf. on Intelligent Robots and Systems* [*IROS*], Pittsburgh, PA, Aug. 1995.

* cited by examiner

*Primary Examiner* — Julie Lieu

(57) ABSTRACT

This invention discloses a haptic interface system that uses Lorentz forces to provide magnetic levitation for a handle which can be manipulated by a person, typically a computer user.

14 Claims, 29 Drawing Sheets

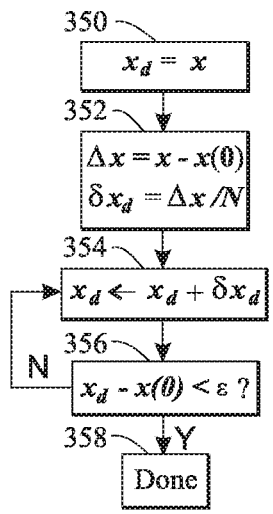 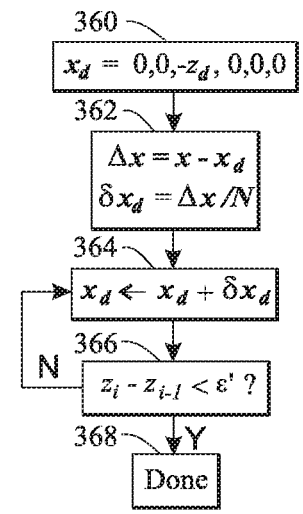
Fig. 22A  Fig. 22B
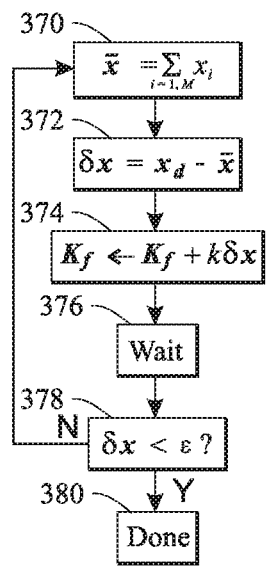
Fig. 23

MAGNETIC LEVITATION HAPTIC INTERFACE SYSTEM

CROSS REFERENCE TO RELATED APPLICATIONS

The present application claims the benefit of Provisional Patent Application Ser. No. 61/156,874, EFS ID: 4890579, entitled "Improved Magnetic Levitation Haptic Interface System," filed Mar. 2, 2009, the entirety of which is hereby incorporated by reference for all purposes.

STATEMENT REGARDING FEDERALLY FUNDED RESEARCH

This invention was made with support from the United States Government under Grant Number CNS0625796 awarded by the National Science Foundation. The United States Government has certain rights in the invention.

BACKGROUND OF THE INVENTION

1. Field of the Invention

The present invention relates generally to human-computer interaction, and more particularly, to haptic computer interfaces which measure position/orientation input from a computer user's hand while providing force/torque output to the user's hand.

2. Description of Prior Art

The term "haptics" refers to the human sense of touch. In recent decades, there has been a great deal of attention to providing computer interfaces that, in addition to the usual keyboard and mouse input devices, and visual output provided by the display on a monitor, can also engage the computer user's sense of touch. Generally, these haptic devices have a manipulandum or handle that can be grasped and moved about by the user to provide position input to a computer, in a manner similar to that of a computer mouse. Unlike a mouse, which can be moved in the plane of the desktop [2 degrees of freedom (DOF)], some haptic devices allow translational movement in all 3 DOFs while providing force back to the user's hand, and still others add rotational DOFs which also provide torque feedback. Of particular interest are those haptic devices with 6 DOFs, because 6 DOFs are needed to position and orient a rigid body in space.

Prior art haptic devices fall into two broad categories: i) electromechanical devices which are small robot arms with serial or parallel kinematic configurations (or a combination of serial and parallel aspects), and ii) non-mechanical devices which use principles of magnetic levitation. Haptic devices in the first category have been available commercially for some time from companies such as Sensable Technologies, Woburn, Mass., USA; Immersion, San Jose, Calif., USA; Mimic Technologies Inc., Seattle, Wash., USA; Force Dimension, Nyon, Switzerland; MPB Technologies Inc., Montreal, Quebec, Canada; Quanser, Inc., Markham, Ontario, Canada; Moog-FCS, Nieuw-Vennep, Netherlands; and Haption S. A., Soulge sur Ouette, France. Devices marketed by these and other firms, being electromechanical in nature, necessarily incorporate motors, encoders, links, joints, and transmission elements such as gears, capstans, cables, or belts. Whereas this body of prior art may serve as background for haptic interface devices per se, the present invention achieves similar functional goals through a fundamentally different mechanism, namely, magnetic levitation. Haptics based on magnetic levitation is capable of much higher performance since it can avoid unwanted artifacts associated with electro-mechanical devices.

Magnetic levitation (or magnetic suspension) devices have a long history and depend on various principles for their operation. These include magnetic bearings and magnetic levitation ("maglev") trains, as well as numerous toys illustrating magnetic levitation. Of particular interest is Downer, et al., U.S. Pat. No. 4,700,094, issued Oct. 13, 1987, which describes a magnetic bearing utilizing Lorentz forces for maintaining the rotation of a flywheel which may be subject to small disturbances. Of tangential interest is Anderson, et al., U.S. Pat. No. 4,156,548, issued May 29, 1979, which describes a magnetic suspension and pointing system utilizing Maxwell forces. Of closest interest is Hollis, U.S. Pat. No. 4,874,998, issued Oct. 17, 1989, which describes a magnetically levitated fine motion robot wrist using Lorentz force actuation with a workspace of several millimeters. None of this art pertains to haptics or haptic devices.

The first use of magnetic levitation principles for a haptic device is disclosed in Hollis and Salcudean, U.S. Pat. No. 5,146,566, issued Sep. 8, 1992. This patent shows a hexagonal levitated body supported by Lorentz forces and using optical position sensors, rendering it capable of six-degree-of-freedom (DOF) motion and force/torque output. It is described as an input/output system for computer user interface, i.e., it describes a haptic device. Further, the invention describes, in general terms, various software elements for connecting and communicating between a computer user's software program and the magnetic levitation device. The device lacks the large workspace, light weight composite levitating element, interchangeable handles, reorientation capability, and automatic software procedures of the present invention.

The paper "Lorentz levitation technology: a new approach to fine motion robotics, teleoperation, haptic interfaces, and vibration isolation," by R. L. Hollis and S. E. Salcudean, appeared in the International Symposium for Robotics Research, Hidden Valley, Pa., in Oct. 1-3, 1993, and further describes haptic interaction and other applications using magnetic levitation.

A motion scaling tele-operating system with force feedback suitable for microsurgery is disclosed in Salcudean, et al., U.S. Pat. No. 5,382,885, issued Jan. 17, 1995. The system uses a pair of hexagonal magnetic levitation devices in a master/slave arrangement providing haptic feedback to the user. An alternative magnetic levitation tele-operation system with haptic feedback is described in the paper "Design and control of a force-reflecting teleoperation system with magnetically levitated master and wrist," Salcudean, Wong, and Hollis, *IEEE Transactions on Robotics and Automation*, Vol. 11, pages 844-858, December, 1995. The paper "Interacting with virtual environments using a magnetic levitation haptic interface," by P. Berkelman, R. Hollis, and S. Salcudean, in *IEEE International Conference on Robotics and Automation*, Pittsburgh, August, 1995, pages 2296-2301, further describes haptic interaction between a computer program and a magnetic levitation device. Again, these devices lack the large workspace, light weight composite levitating element, interchangeable handles, reorientation capability, and automatic software procedures of the present invention.

Salcudean, et al., disclose an active joystick with optical position sensing in U.S. Pat. No. 6,195,083 B1, issued Feb. 27, 2001, which has a cubic configuration and very small workspace. This device was planned for commercialization, but never materialized. This device lacked the large workspace, light weight composite levitating element, interchangeable handles, reorientation capability, and automatic software procedures of the present invention. U.S. Pat. No. 5,790,108 issued to Salcudean, et al., on Aug. 4, 1998 describes a specific application of the Lorentz force coils in a hand controller.

The paper "Design of a hemispherical magnetic levitation haptic interface device," by P. Berkelman, Z. J. Butler, and R. L. Hollis, in the *ASME International Mechanical Engineering Congress and Exposition*, Atlanta, November 1996, DSC-Vol. 58, pages 483-488, describes a design for a large workspace Lorentz magnetic levitation haptic device. This device lacks the light weight composite levitating element, interchangeable handles, reorientation capability, and automatic software procedures of the present invention.

Watanabe, et al. describe a magnetic actuator with reduced magnetic flux leakage and haptic sense in U.S. Patent Application Publication No. US 2004/0059245 A1, published Mar. 25, 2004 and in U.S. Pat. No. 7,336,006 B2. A similar much earlier design, by R. Hollis, "Ultrafast electrodynamic X, Y, and theta positioning stage," was disclosed in U.S. Pat. No. 5,153,494, issued Oct. 6, 1992. These devices do not use magnetic levitation.

Li, et al., in U.S. Pat. No. 6,483,499 B1, issued Nov. 19, 2002, disclose a 3D sculpturing input device using a magnetized stylus held by the user. Hu, in U.S. Patent Application Publication No. US 2006/0209019 A1, published Sep. 21, 2006, discloses a magnetic haptic feedback system and methods for virtual reality environments. The system uses a magnetized tool upon which forces are generated with electromagnets. Neither of these devices use magnetic levitation as in the present invention.

The paper "A novel coil configuration to extend the motion range of Lorentz force magnetic levitation devices for haptic interaction," by P. Berkelman, *Proceedings of IEEE/RSJ International Conference on Intelligent Robots and Systems*, San Diego, Oct. 29 through Nov. 2, 2007, pages 2107-2112, describes a magnetic levitation haptic device with permanent magnetic circuits and coil design to permit large translational and rotational motion. This device, while having a larger motion range than the present invention, does not have a light weight composite structure, and lacks a viable scheme for providing high resolution position/orientation sensing.

In summary, each of the prior art haptic devices and systems, whether based on electro-mechanical methods or on magnetic levitation methods suffers from one or more limitations which the present invention overcomes.

OBJECTS AND ADVANTAGES

Accordingly, several objects and advantages of the present invention are given below, where the term "device" refers to the haptic interaction device alone, and the word "system" refers to the combination of the device and its hardware/software controller.

(a) A six-degree-of-freedom haptic device that is free of friction, backlash, link bending, cable or belt stretch, limited encoder resolution, and motor cogging effects which limit the performance of current electro-mechanical haptic devices;

(b) a haptic device based on Lorentz magnetic levitation which has a usable workspace which is much larger than that afforded by previous magnetic levitation devices;

(c) a haptic device which has very high spatial resolution, of the order of 2 micrometers, compared with about 50 micrometers for the most popular electro-mechanical device;

(d) a haptic device which can emulate very high stiffness, of the order of 50 N/mm, compared with about 2 N/mm for the most popular electro-mechanical device;

(e) a haptic device which incorporates high mechanical damping as well as high electrodynamic damping and is free of spurious resonant behavior;

(f) a haptic device with very high position and force bandwidths to engage not only the user's kinesthetic senses, but also to a significant degree the user's cutaneous senses;

(g) a magnetic levitation haptic device that can be readily re-oriented to an attitude which accommodates a person's preferences;

(h) a magnetic levitation haptic device which has a manipulandum or handle which can be easily interchanged with alternate handles;

(i) a magnetic levitation haptic device that incorporates push buttons in the handle which can be used to signal a user's application program;

(j) a six-degree-of-freedom magnetic levitation haptic device which incorporates an additional seventh, grasping degree of freedom;

(k) a magnetic levitation haptic system where the haptic device and haptic controller may be separated and located at a convenient distance from one another;

(l) a magnetic levitation haptic system whose levitated part, termed a flotor, can automatically take-off/land from/to resting configurations for the convenience of the user; and (m) a magnetic levitation haptic system which can automatically cancel gravitational forces and torques on the levitated part for the convenience of the user.

SUMMARY OF THE INVENTION

The invention is a magnetic levitation haptic system (device and controller) with a handle operable by a person which sends position/orientation information to a person's computer, while accepting force/torque commands from the person's computer and applying them to the handle, thereby enabling a person to interact with a computer program using his or her sense of touch. Lorentz levitation permits the device part of the system to be free of static friction, link bending, encoder resolutions, motor cogging and backlash effects present in traditional electro-mechanical haptic devices. The handle may be moved about in six degrees of freedom, while the person using the device feels six-degree-of-freedom forces and torques on the handle. The invention may be part of a virtual reality system, or connected to a remote robot system capable of measuring forces and torques in the remote environment. Very high performance is obtained, in part, through having a light weight composite levitated element with high mechanical and electrodynamic damping. The device's handle is removable and interchangeable with other handles of various forms and functionality as may be required by the application. The system accommodates a particular kind of "grasping" handle which constitutes an additional seventh degree of freedom, for example a pinching motion between thumb and forefinger. The device can be readily rotated by the user to any desired attitude according to the user's preferences. The system includes an Application Programming Interface and algorithms in the controller for automatically taking off and landing the handle, and for automatically finding and canceling gravitational forces and torques on the levitated part. Intended applications of the invention include virtual surgery and dentistry, data visualization, remote robot control, micro- and nano-manipulation, microsurgery, and character animation.

BRIEF DESCRIPTION OF THE DRAWINGS

The features of the invention believed to be novel and the elements characteristic of the invention are set forth with particularity in the appended claims. The invention itself, however, both as to organization and method of operation, may best be understood by reference to the detailed description which follows taken in conjunction with the accompanying drawings in which:

FIG. 22A diagrams the algorithm for taking off and levitating the flotor assembly.

FIG. 22B diagrams the algorithm for landing the flotor assembly.

FIG. 23 diagrams the algorithm for finding and canceling the gravitational forces and torques.

DETAILED DESCRIPTION OF AN EMBODIMENT

FIGS. 1A-15

Figure 1A:
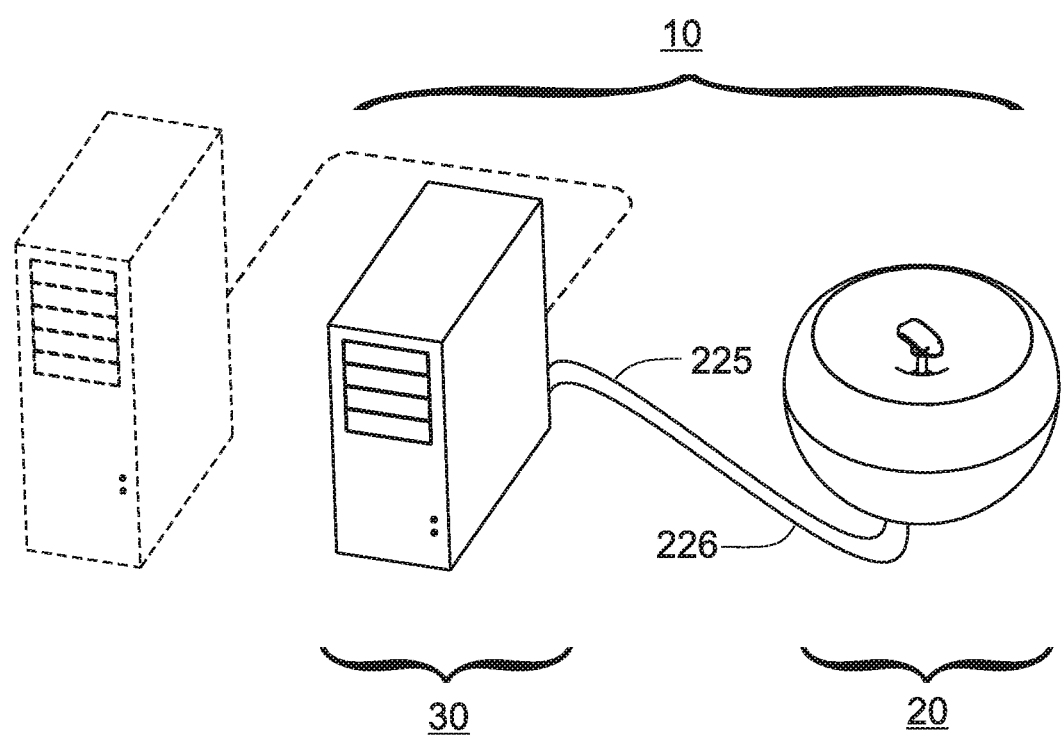
FIG. 1A is an overall view of the invention showing device and controller parts.

FIG. 1A is an overview of invention 10, an improved magnetic levitation haptic system, comprising device 20, controller 30, actuator cable 225, and sensor cable 226. Cables 225 and 226 connect between controller 30 and device 20. Invention 10 is shown connected by a serial link to a computer user's client computer (dashed outline).

Figure 1B:
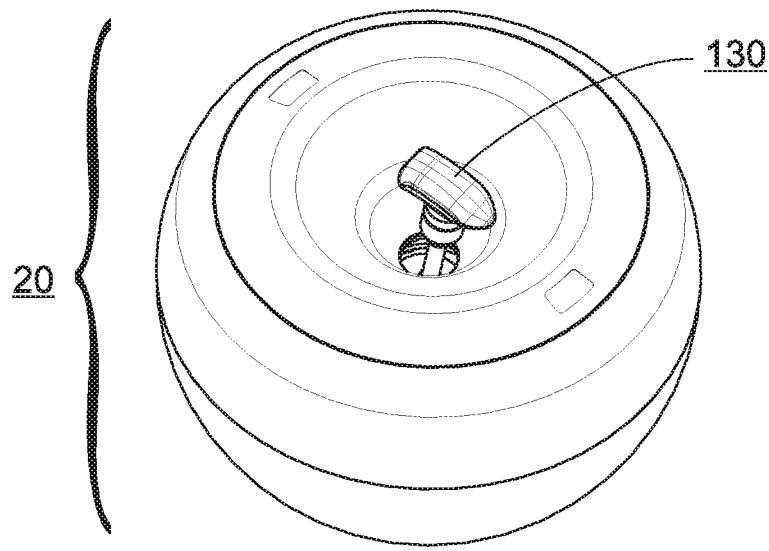
FIG. 1B shows an overall view of the device part of the invention from an overhead perspective.
Figure 1C:
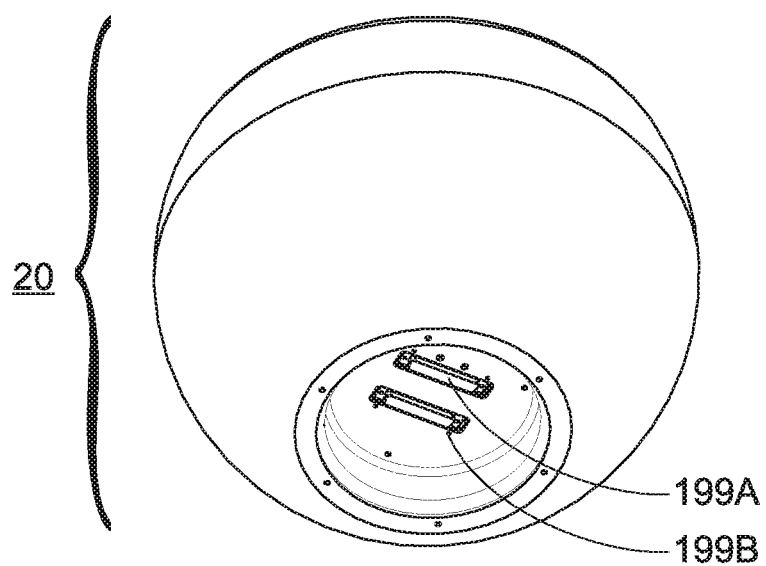
FIG. 1C shows an overall view of the device part of the invention from a lower perspective.

Referring to FIG. 1B, there is an overall view of device 20 showing haptic (force feedback) handle 130. Device 20 contains several parts and sub-assemblies which are detailed in subsequent figures. Handle 130 is designed to be grasped and moved by the human hand. FIG. 1C shows a view of device 20 from a lower viewpoint, also showing actuator cable connector 199A and sensor cable connector 199B, which connect to actuator cable 225, and sensor cable 226, respectively (see FIG. 1A).

Figure 1D:
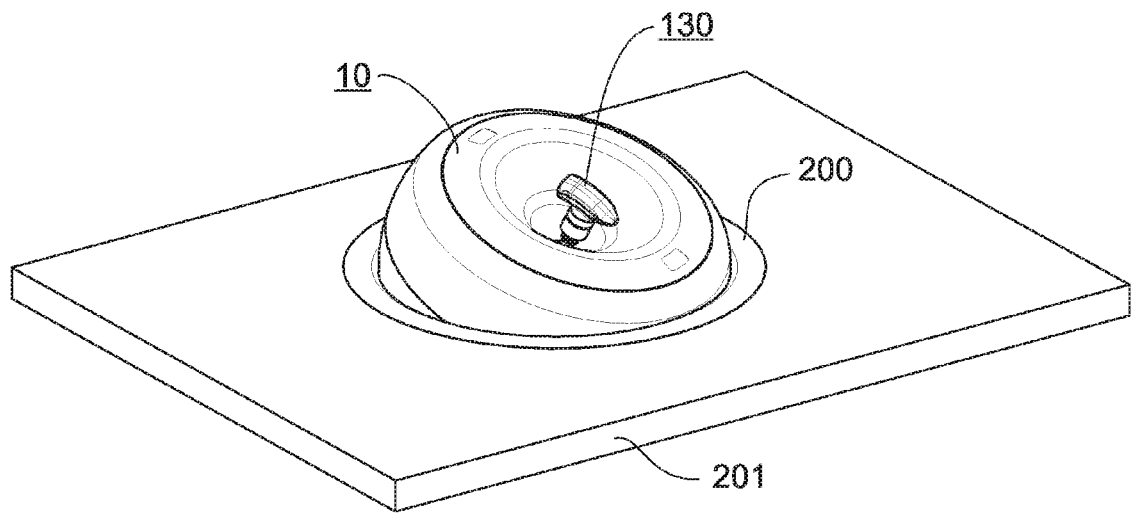
FIG. 1D shows the device part of the invention in its usual configuration mounted in a table work surface.

FIG. 1D shows device 20 resting and oriented in a table work surface 201 as facilitated by mounting ring 200.

Figure 2A:
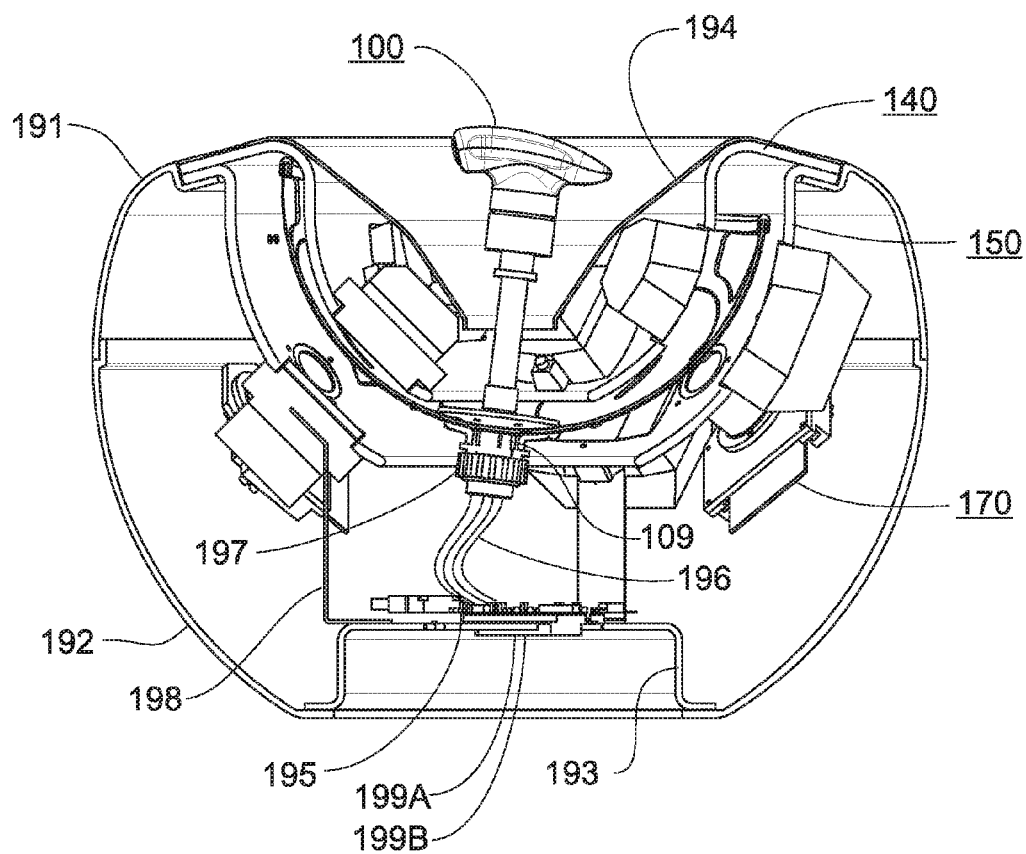
FIG. 2A is a cross-sectional view of the device.

FIG. 2A is a cross-sectional cutaway view of device 20. There are four sub-assemblies visible in this view as well as a number of other parts. Bowl-shaped inner stator assembly 140 is attached to bowl-shaped outer stator assembly 150 by means of screws (not shown). Flotor assembly 100 is free to move between inner stator assembly 140 and outer stator assembly 150 except that it is partially constrained in rotation about its principal axis of symmetry as explained in reference to FIG. 12. A triad of optical sensor assemblies 170 are fastened to the outer surface of outer stator assembly 150 by screws (not shown). Magnet cover 194 partially covers inner stator assembly 140, and is fastened in place with hook and loop type fasteners. Thin annular upper case shell 191 is fastened to inner and outer stator assemblies 140 and 150 by screws (not shown). A triad of support legs 198 attach at their upper parts to outer stator assembly 150 by means of screws (not shown), and attach at their lower parts to interface panel 193 by screws (not shown). In turn, large annular lower case shell 192 is fastened to interface panel 193 at its outer flange surface by screws (not shown), mating with upper case shell 191. Also shown is flotor connector 109 with a plurality of highly flexible wires 196 which terminate in interface circuit board 195. Interface circuit board 195 features actuator cable connector 199A and sensor cable connector 199B.

Figure 2B:
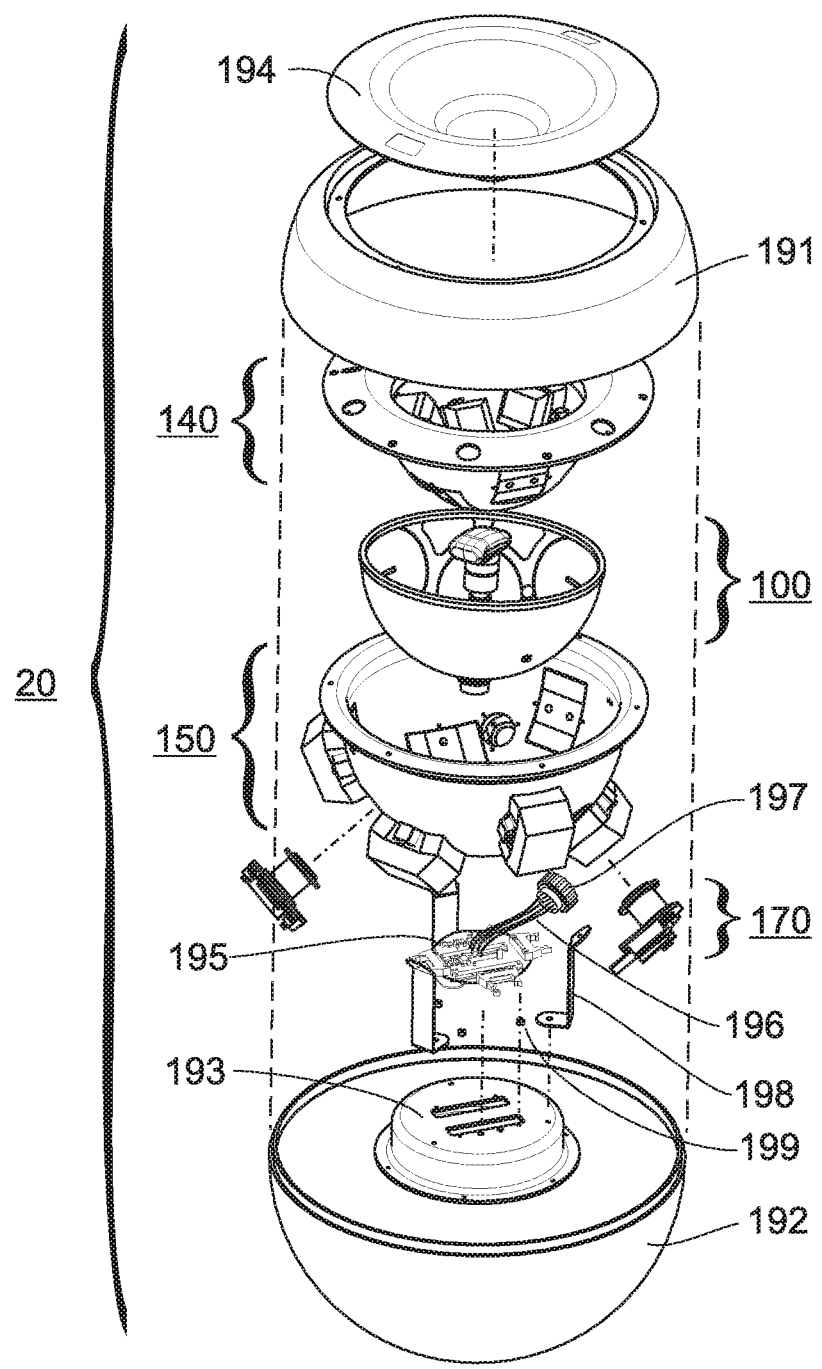
FIG. 2B is an exploded view of the device showing internal parts and sub-assemblies.

FIG. 2B is an exploded view of device 20. From top to bottom, there is magnet cover 194, upper case shell 191, inner stator assembly 140, flotor assembly 100, outer stator assembly 150, triad of optical sensor assemblies 170 (two are visible), flotor flexible wire connector 197, flexible wires 196, interface circuit board 195, triad of support legs 198, interface panel 193, and lower case shell 192. Dashed lines indicate how upper case shell 191 mates with lower case shell 192.

Figure 3A:
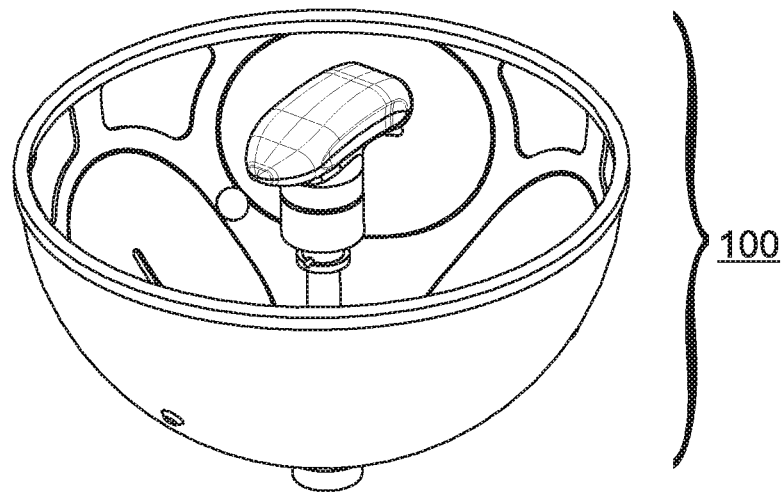
FIG. 3A is a three-quarter side view of the levitated flotor portion of the device.
Figure 3B:
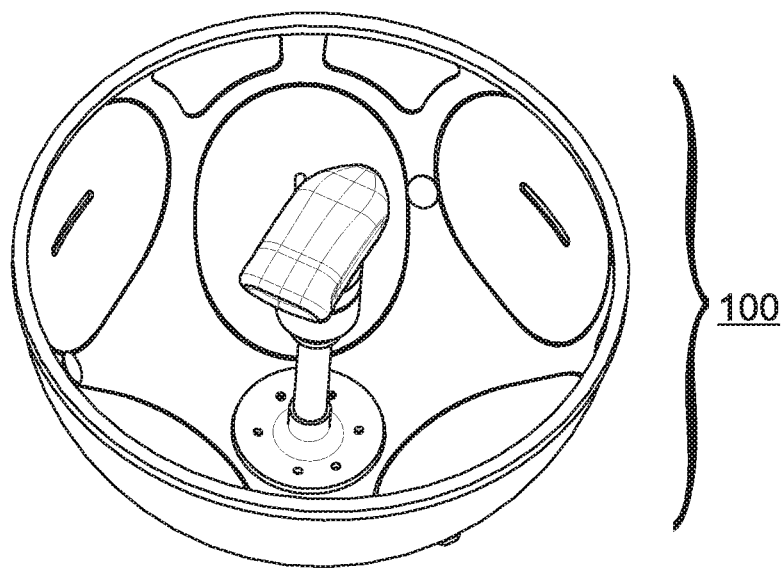
FIG. 3B is a view of the levitated flotor portion of the device rotated and elevated from the view of FIG. 3A.
Figure 4:
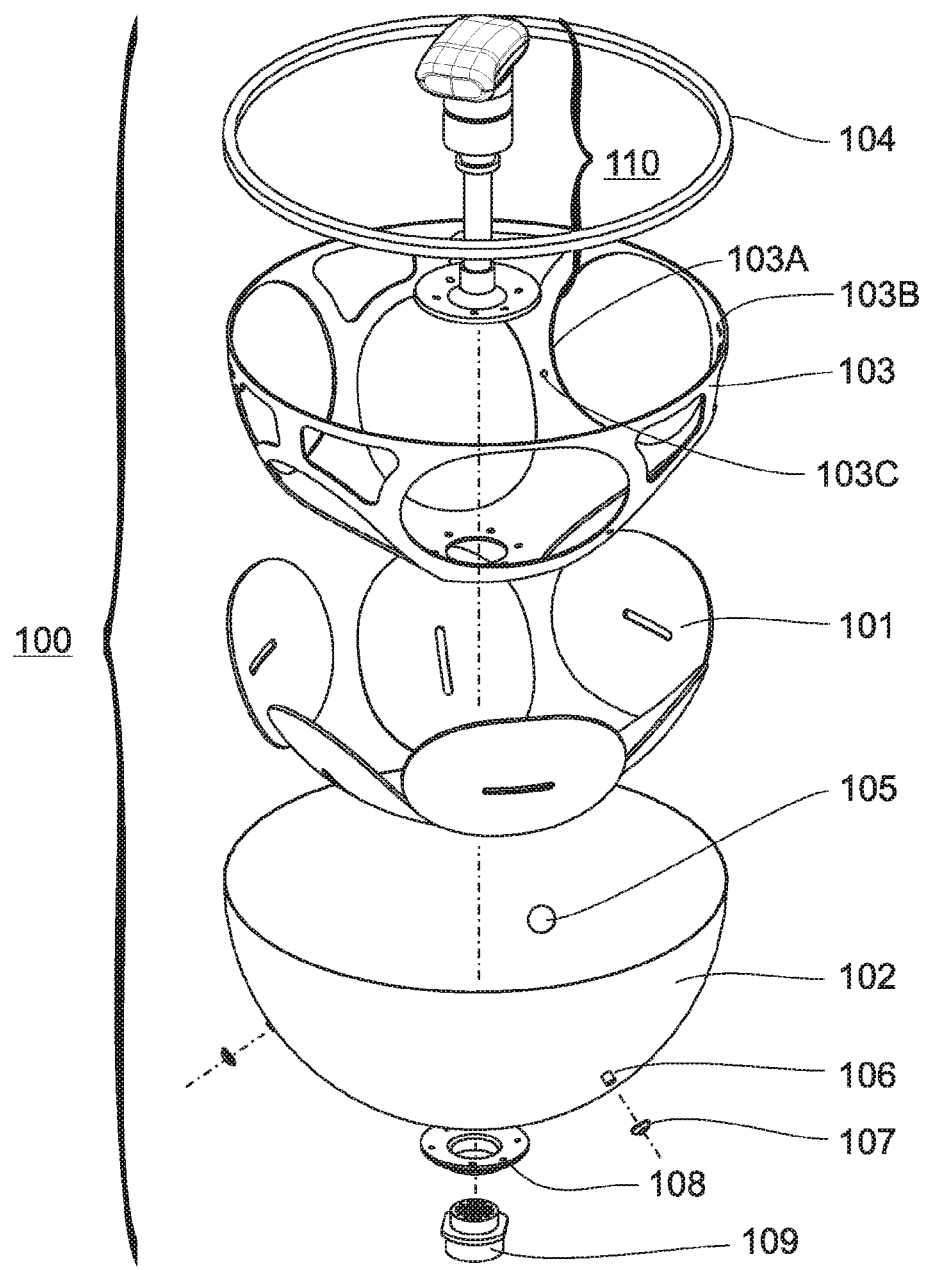
FIG. 4 is an exploded view of the levitated flotor portion of the device.

FIG. 3A is a three-quarter view of flotor assembly 100, whereas FIG. 3B is a more overhead view showing the arrangement of its internal parts made more apparent by the exploded view of FIG. 4. From top to bottom, flotor ring 104 has an annular groove which is bonded to the upper edge of flotor structural member 103. Six racetrack-shaped spherical coils 101 fit within cutout features 103A. Structural member 103 and coils 101 are bonded to thin flotor damper shell 102. A triad of light-emitting diode (LED) circuit boards 105 with attached LEDs 106 are bonded to the inner surface of structural member 103 with LEDs 106 protruding outward through holes in structural member 103 and damper shell 102. Small washer-shaped LED shields 107 surround the sides of each LED 106 and are bonded to the outer surface of damper shell 102. The combination of parts 104, 103, 101, 105, 106, 107, and 102, when assembled and bonded together with adhesives thus form a rigid structure. Handle and stem assembly 110 is rigidly fastened to connector collar 108 by screws (not shown) through holes seen in structural member 103 and through aligned holes in damper shell 102. Flotor connector 109 is bonded to connector collar 108, completing flotor assembly 100.

Figure 5A:
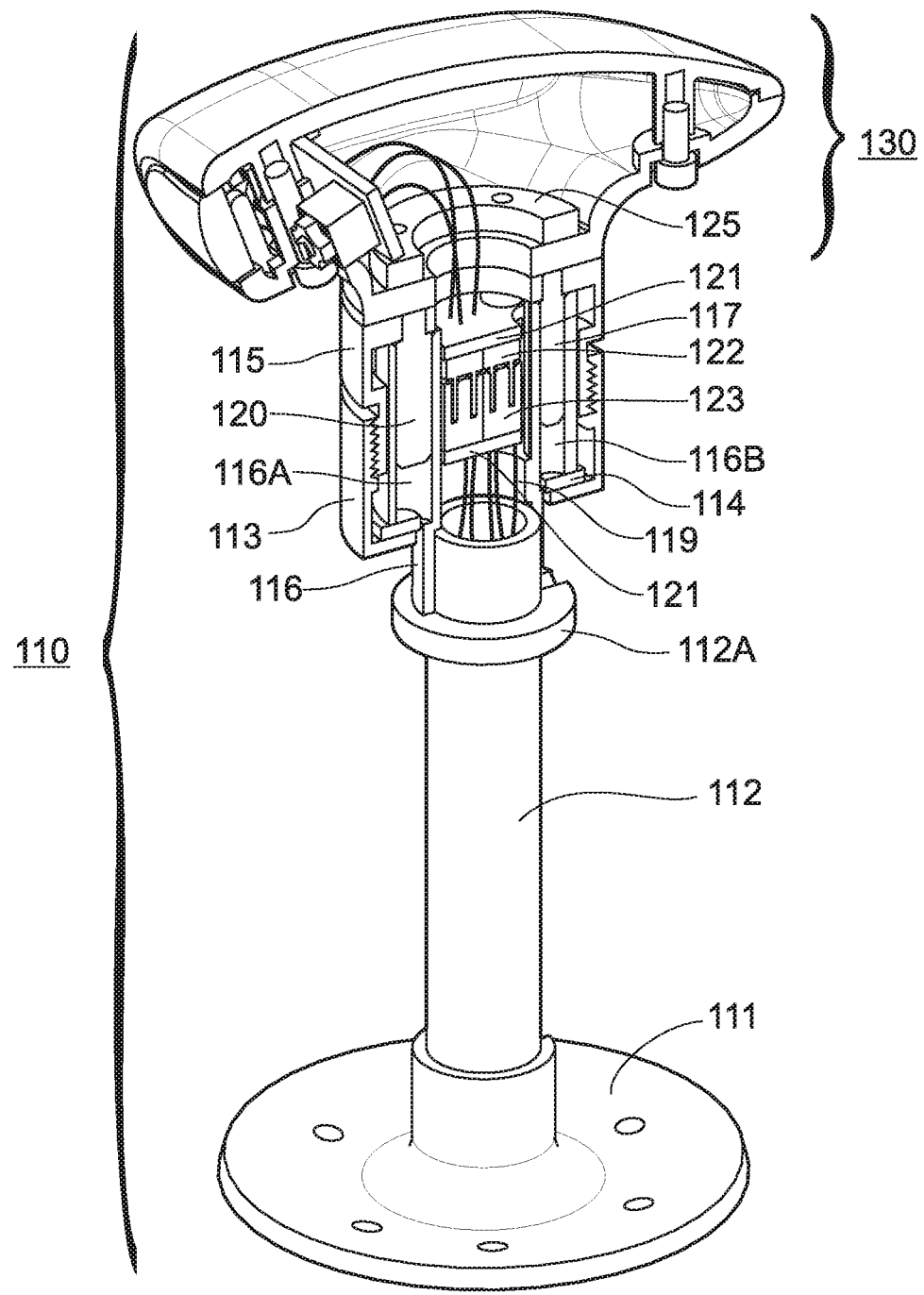
FIG. 5A is a partial cross-sectional view showing a detachable handle portion of the device.
Figure 5B:
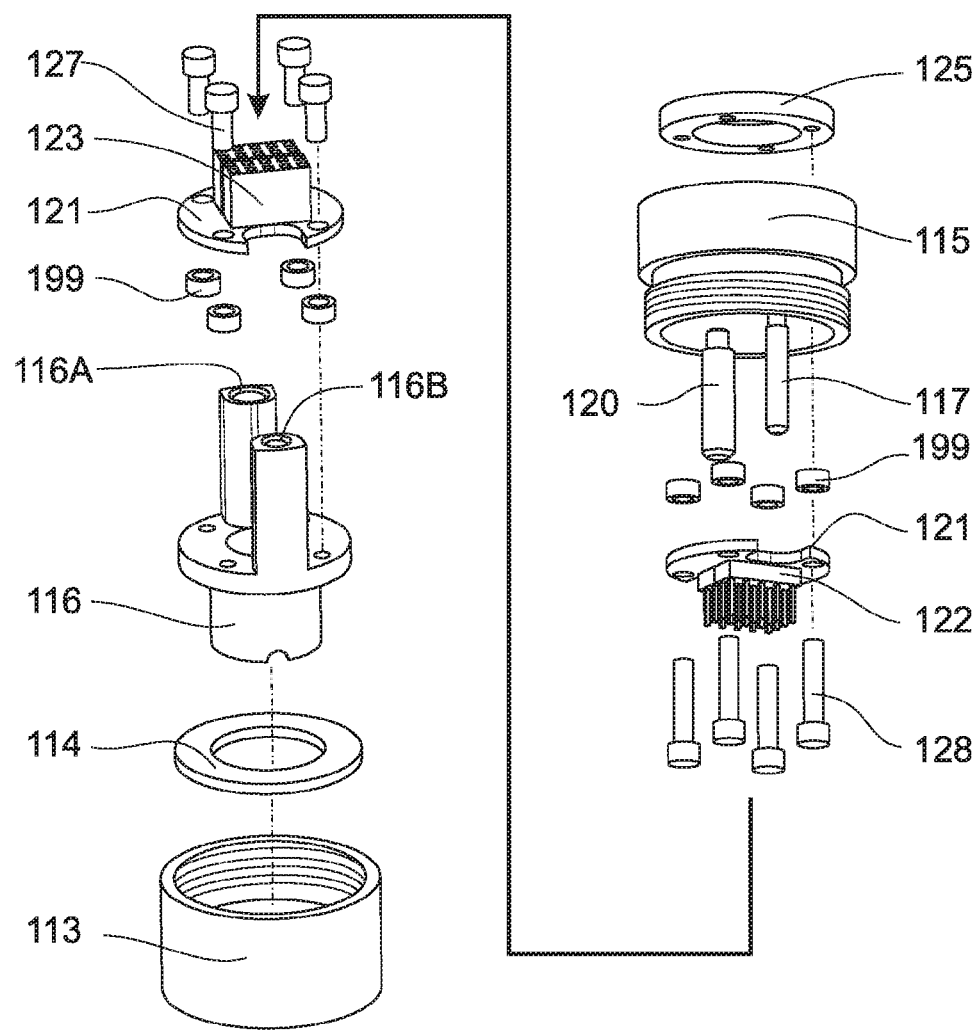
FIG. 5B is an exploded view of the interface portions of the detachable handle shown in shown in FIG. 5A.
Figure 5C:
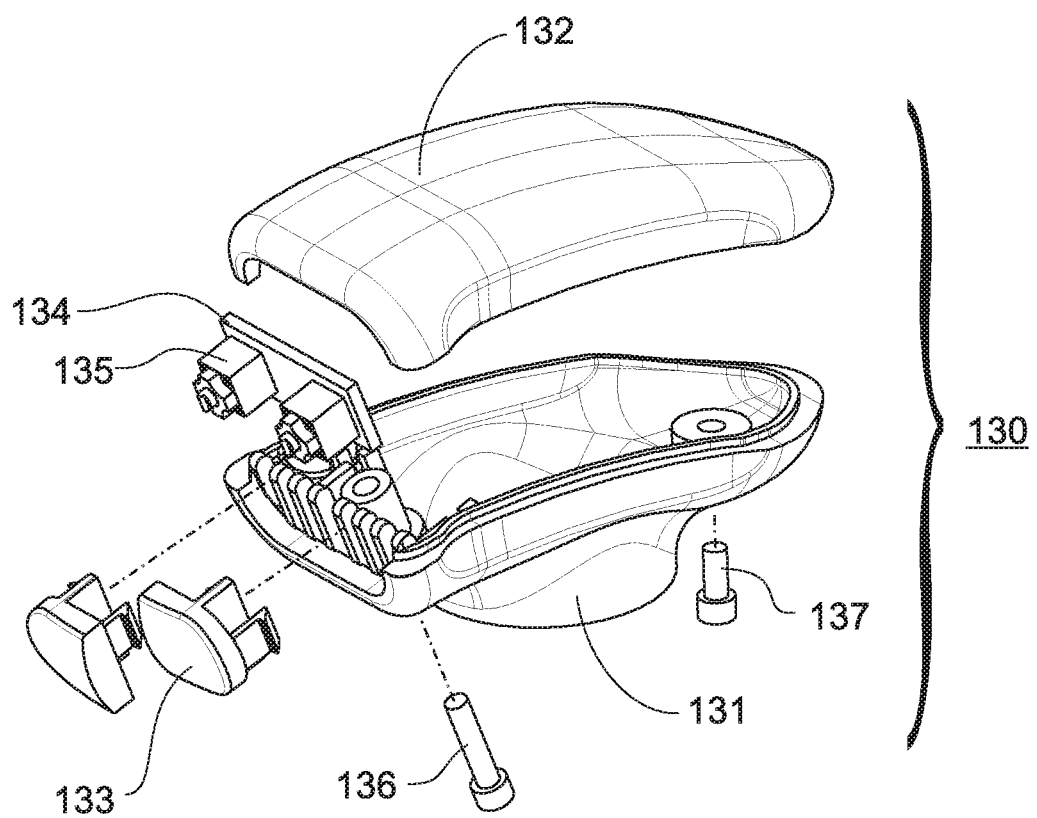
FIG. 5C is an exploded view of the upper portion of the detachable handle shown in FIG. 5A.

FIGS. 5A, 5B, and 5C show increasing levels of detail concerning handle and stem assembly 110. Referring to FIG. 5A, at the bottom there is flotor stem base 111. Stem tube 112 is bonded to stem base 111 at its lower end, and bonded to stem top 116, forming a rigid structure. Stem sleeve 113, which is internally threaded and has a knurled outer surface, surrounds stem sleeve washer 114, and screws onto handle connector 115. When stem sleeve 113 is unscrewed, it can slip down stem tube 112, but is limited in travel by feature 112A. Handle connector 115 has hole features in its upper surface in which large 120 and small 117 alignment pins are mounted by precision interference fits. Stem top 116 has small 116B and large 116A precision hole features which mate with alignment pins 120 and 117. Handle and stem circuit boards 121 are mounted internally to handle connector 115 and stem top 116 by means of screws (not shown). Plug connector 122 is mounted on handle circuit board 121, whereas socket connector 123 is mounted on identical stem circuit board 121. Plug connector 122 has a plurality of electrical connection pins, whereas socket connector 123 has a like number of electrical sockets. Handle assembly 130 is attached to handle connector 115 by means of screws (not shown) which extend into threaded holes in handle retaining nut 125. Handle 130 and its associated parts 125, 115, 120, 117, 121, 122 may thusly be separated as a group from the remainder of assembly 110 by unscrewing stem sleeve 113, and pulling them apart.

FIG. 5B is an exploded view showing internal parts of handle and stem assembly 110. Beginning on the top right portion of the figure, there is handle retaining nut 125, handle connector 115 with its attached large alignment pin 120 and small alignment pin 117. Handle connector 115 mates with stem sleeve 113 by threads, while large alignment pin 120 and small alignment pin 117 mate by insertion with stem top 116 large 116A and small 116B precision hole features, respectively. Handle circuit board 121 with plug connector 122 is fastened by screws 128 with spacers 199 to handle retaining nut 125. Moving to the left side of FIG. 5B, it is seen that stem circuit board 121 with socket connector 123 is attached to stem top 116 with screws 127 and spacers 199. Plug connector 122 mates with socket connector 123. Sleeve washer 114 and stem sleeve 113 fit loosely around stem top 116.

FIG. 5C is an exploded view of handle 130. Handle bottom 131 mates with handle top 132 with screws 136 and 137, capturing handle buttons 133 and circuit board 134. Handle switches 135, mounted on circuit board 134 are in juxtaposition with handle buttons 133.

Figure 6A:
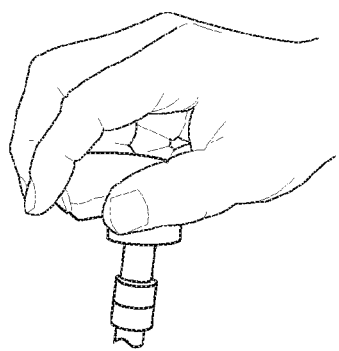
FIG. 6A illustrates an alternative simple handle.
Figure 6B:
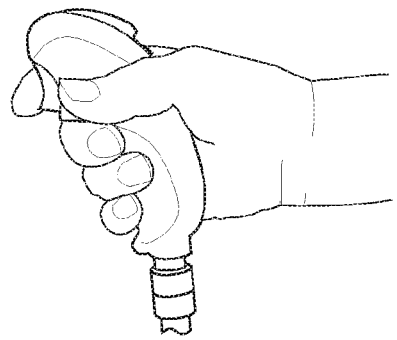
FIG. 6B illustrates an alternative joystick-style handle.
Figure 6C:
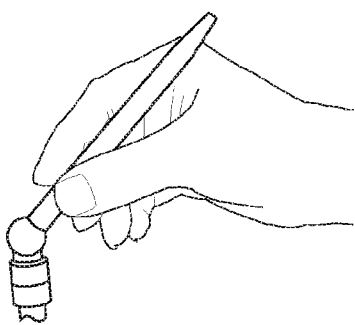
FIG. 6C illustrates an alternative pen-like handle.
Figure 6D:
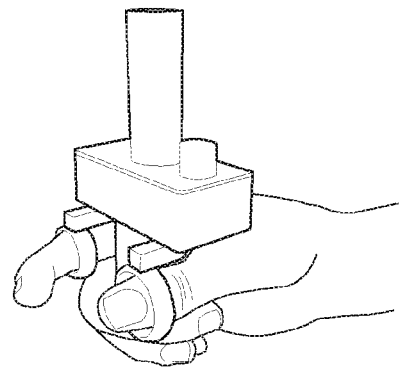
FIG. 6D illustrates an alternative handle which features grasping with force feedback.

FIG. 6A shows a similar simple handle. FIG. 6B shows a handle shaped like a joystick. FIG. 6C shows a pen-like handle. FIG. 6D shows a handle with an extra movement or degree of freedom. All of these and other conceived handles, when equipped with the interface shown in FIGS. 5A and 5B can be used interchangeably, according to a desired application.

Figure 7A:
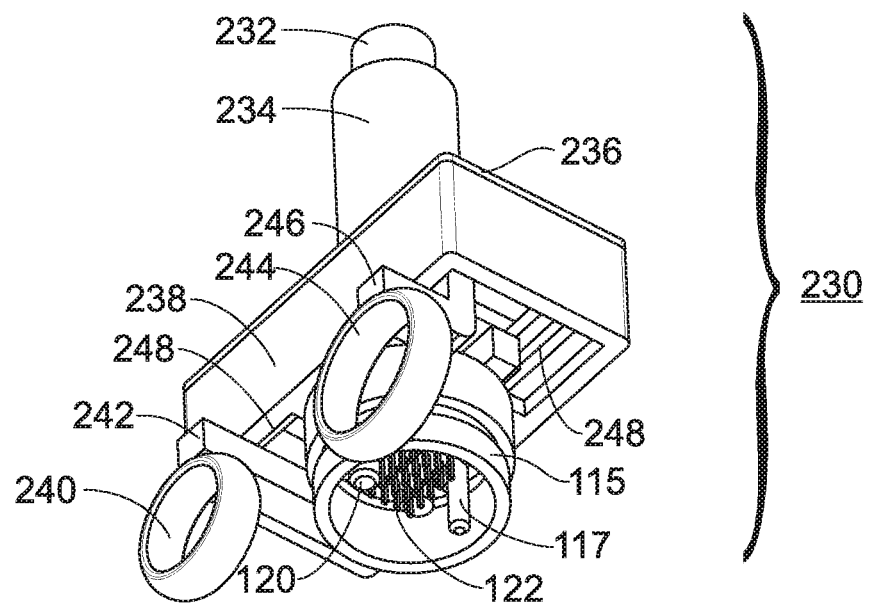
FIG. 7A shows the design of a grasping type handle with force feedback.

FIG. 7A is a detailed design of a grasping handle which is part of invention 10. Motor 234 with potentiometer 232 is rigidly mounted to handle housing 238, through cover plate 236. A pair of linear slides 248 are mounted on opposite inside surfaces of housing 238. Slides 248 have a fixed part attached to housing 238, and a movable part attached to L-shaped bars 242 and 246. Bar 242 is rigidly attached to forefinger ring 240, whereas bar 246 is rigidly attached to thumb ring 244. Several parts of the flotor stem interface are shown, such as handle connector 115, handle plug 122, and alignment pins 120 and 117.

Figure 7B:
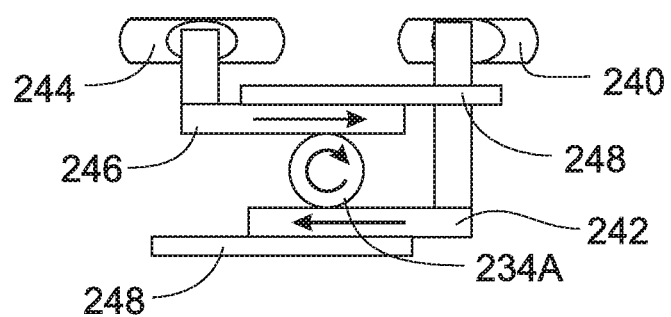
FIG. 7B shows the operating principle of a grasp type handle.

FIG. 7B shows the active parts of the grasping handle shown in FIG. 7A. Linear slides 248 have a fixed stationary part and a movable part (not visible) attached to L-shaped bars 242 and 246 rigidly connected to rings 240 and 244. Capstan 234A attached to motor 234 (not shown) engages L-shaped bars 242 and 246.

Figure 8A:
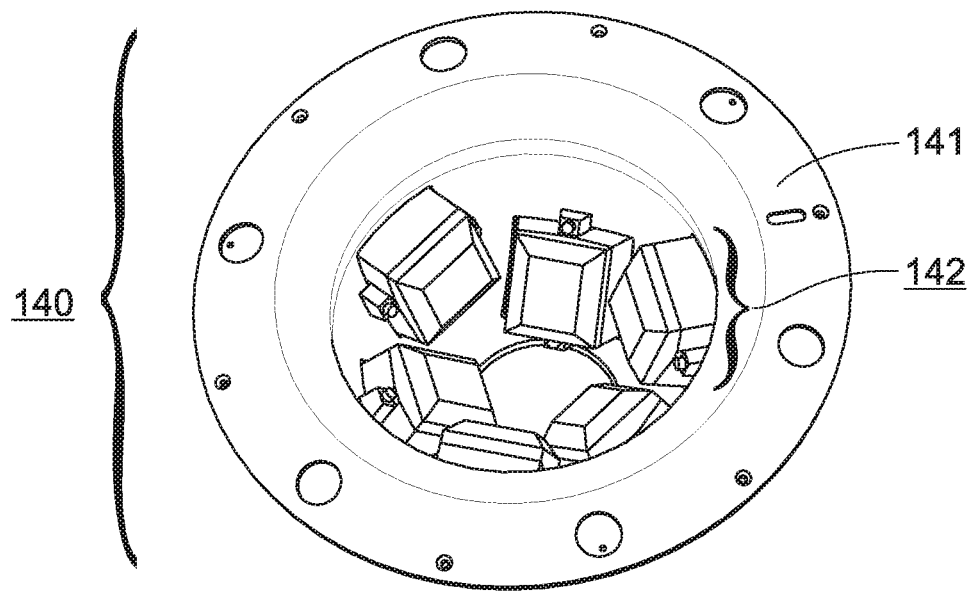
FIG. 8A shows an upper view of the inner stator portion of the device.
Figure 8B:
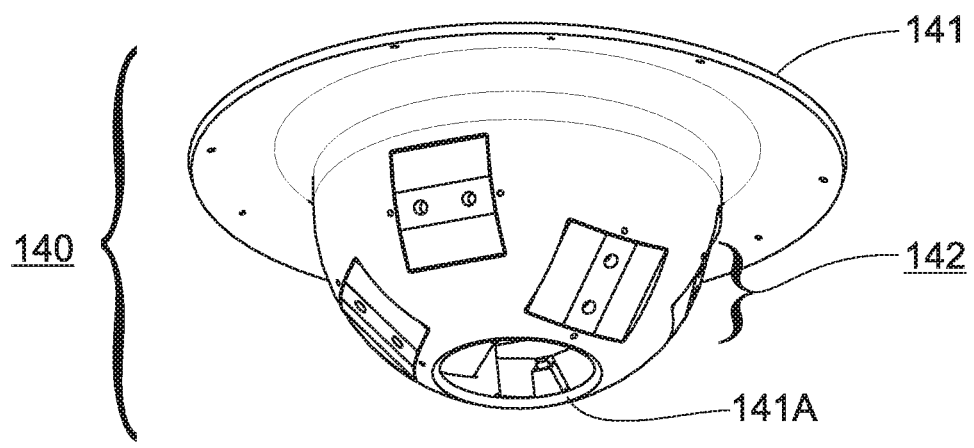
FIG. 8B shows a lower view of the inner stator portion of the device.

FIG. 8A is an upper view of inner stator assembly 140 showing its inside aspects. FIG. 8B is a lower view of inner stator assembly 140, showing large hole feature 141A. Inner stator assembly 140 has a shell 141 and six inner magnet assemblies 142 fastened by screws.

Figure 9:
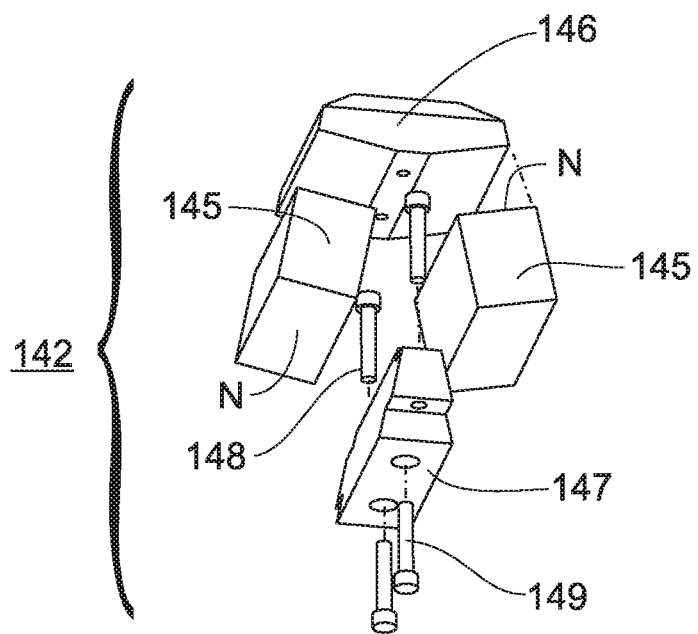
FIG. 9 is an exploded view of one of the magnet assemblies associated with the inner stator.

FIG. 9 is an exploded view of one of six inner magnet assemblies 142 shown in FIG. 8A. Permanent magnets 145 are attached to inner return 146 by magnetic attraction, with their opposite magnetic poles. Inner magnet holder 147 attaches to inner return 146 with screws 149. Inner magnet assembly 142 attaches to inner stator shell 141 by screws 148 as shown in FIG. 8A.

Figure 10A:
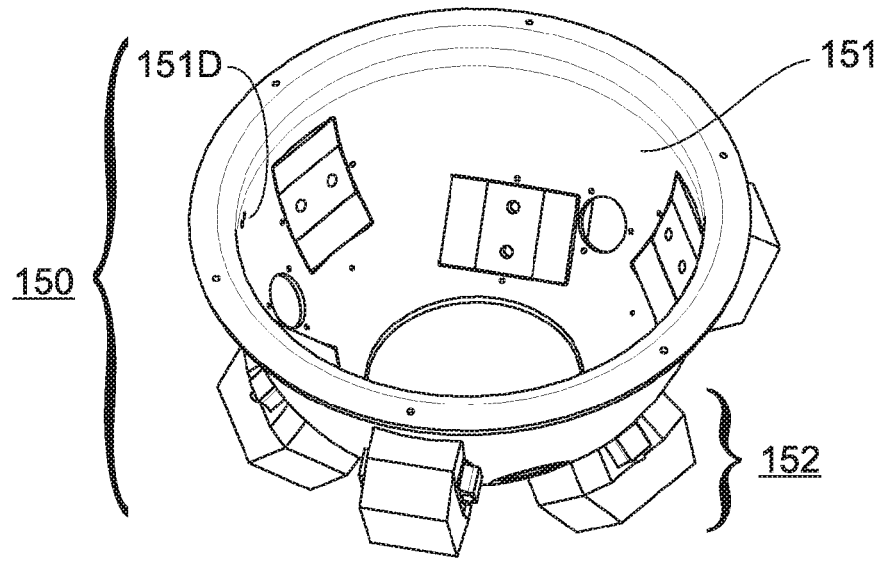
FIG. 10A shows an upper view of the outer stator portion of the device.
Figure 10B:
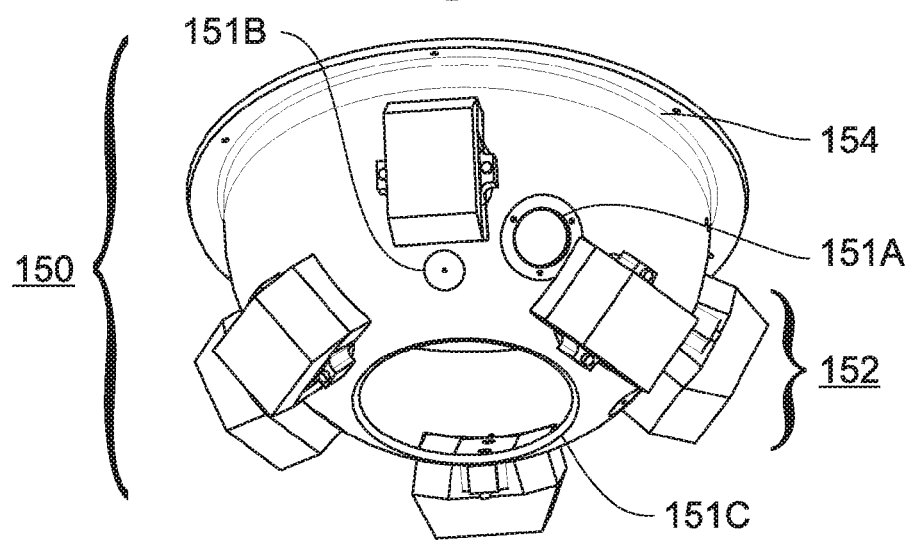
FIG. 10B shows a lower view of the outer stator portion of the device.

FIG. 10A is an upper view of outer stator assembly 150 showing its inside aspects. Outer stator assembly 150 has an outer stator shell 151 and six outer magnet assemblies 152. FIG. 10B is a lower view of outer stator assembly 150 showing a triad of hole features 151A for mounting optical sensor assemblies 170, a triad of flat features 151B for mounting support legs 198, and a large hole feature 151C. Six outer magnet assemblies 152 attach to the outer surface of outer stator shell 151 by screws.

Figure 11:
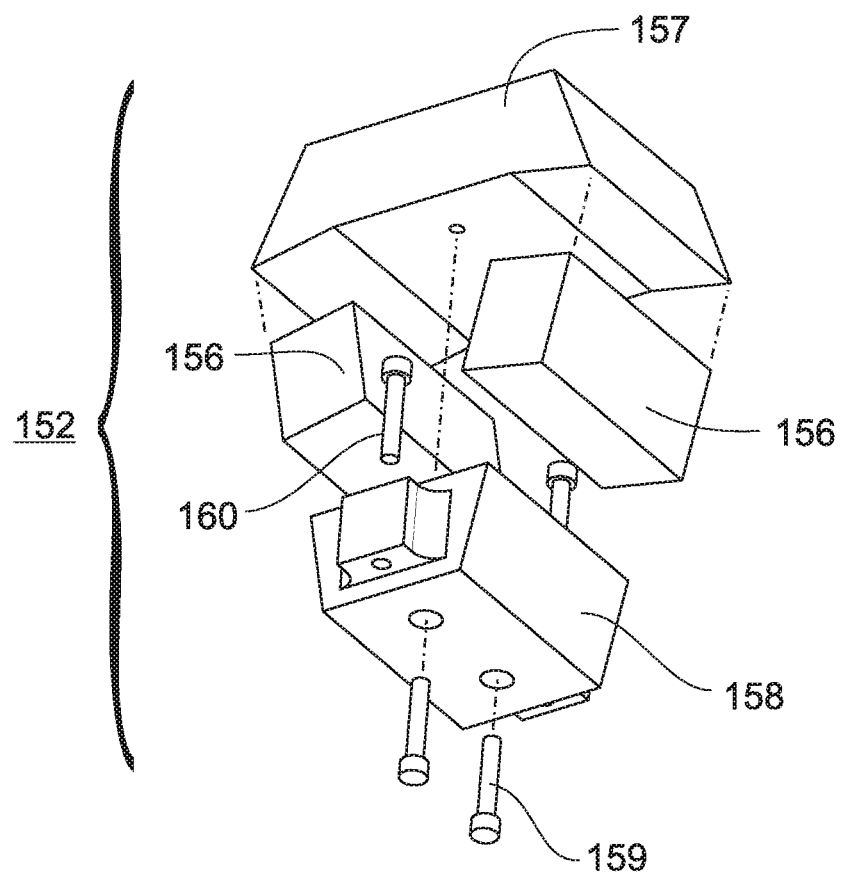
FIG. 11 is an exploded view of one of the magnet assemblies associated with the outer stator.

FIG. 11 is an exploded view of one of six outer magnet assemblies 152 shown in FIG. 10A. Permanent magnets 156 are attached to outer return 157 by magnetic attraction, with their opposite magnetic poles. Outer magnet holder 158 attaches to outer return 157 with screws 159. Outer magnet assembly 152 attaches to outer stator shell 151 by screws 160 as shown in FIG. 10A.

Figure 12:
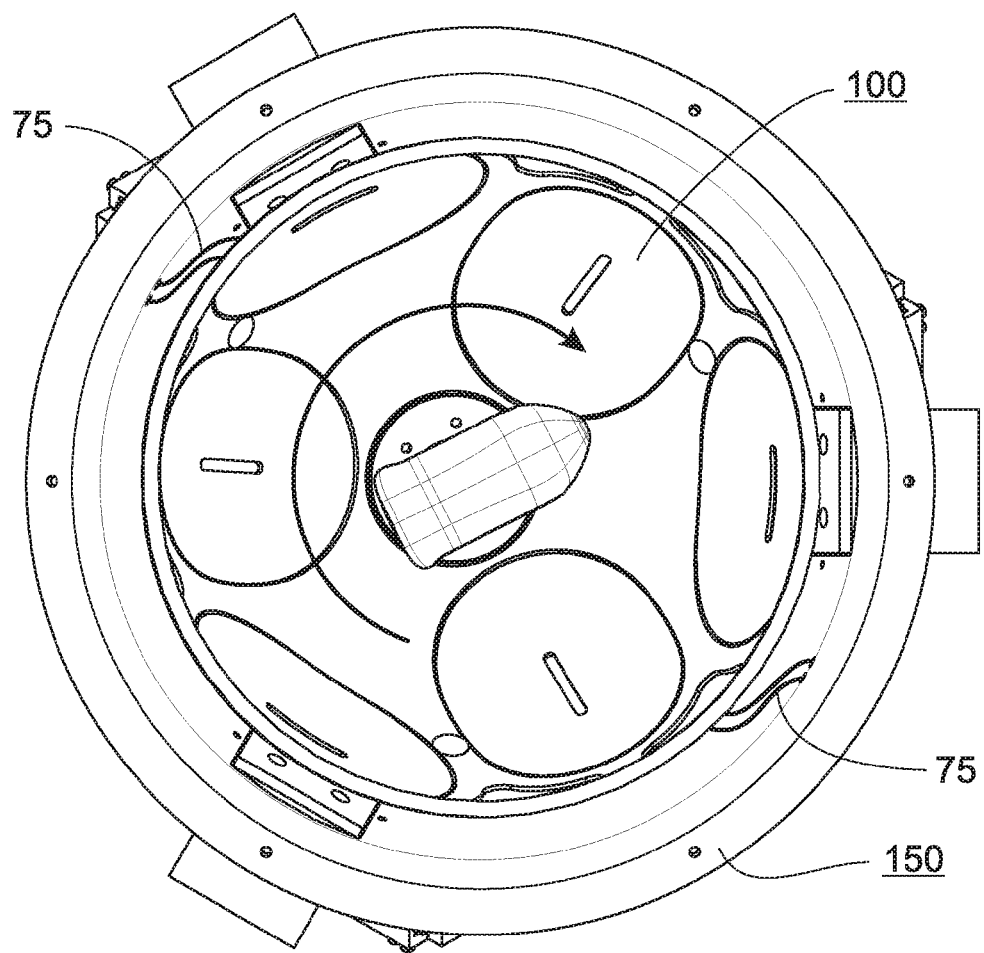
FIG. 12 shows how the flotor portion of the invention is restrained in motion.

FIG. 12 is a view of flotor assembly 100 as it resides within outer stator assembly 150. String loops 75 on either side of flotor assembly 100 pass through hole features 103B and through hole features 151D in either side of outer stator assembly 150. The hole features are depicted in FIGS. 4 and 10A.

Figure 13A:
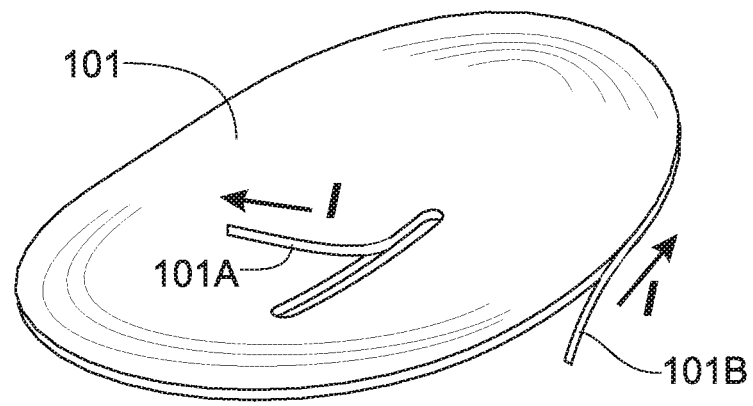
FIG. 13A shows one of the spherical coils which is part of the flotor portion of the device.
Figure 13B:
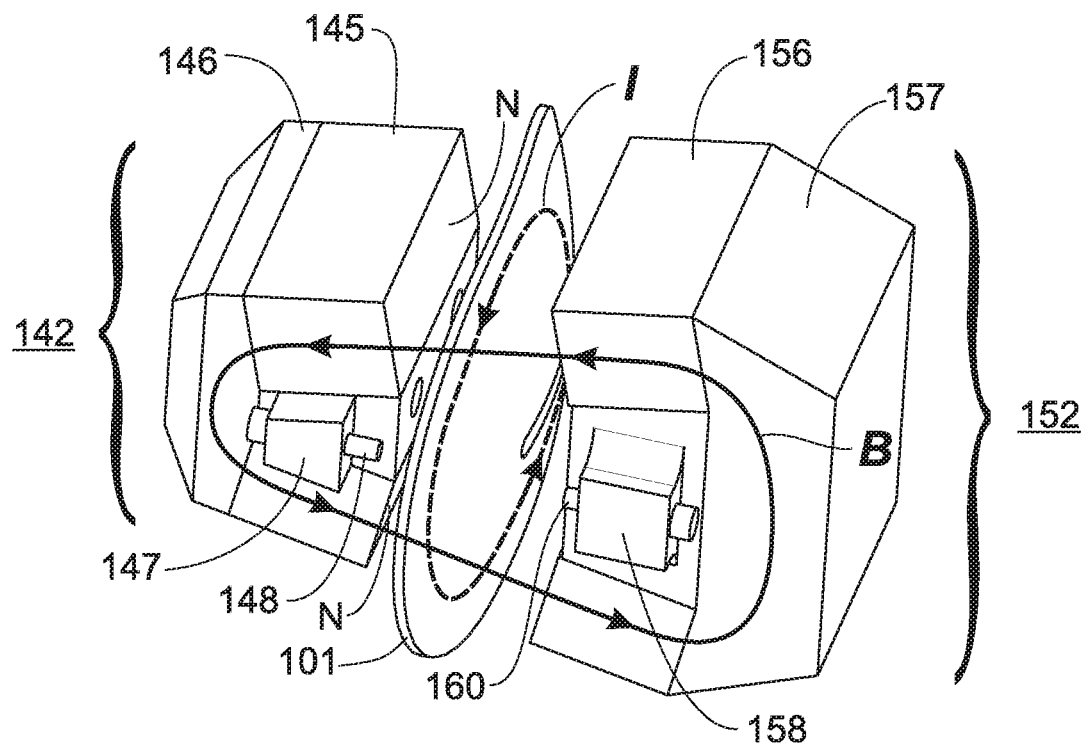
FIG. 13B shows the working relationship between a coil and its associated inner and outer magnet assemblies.

FIG. 13A shows one of six coils 101 which are part of flotor assembly 100 shown in FIG. 3B. Coil 101 has flat wire exemplified by wire lead-in 101A and wire lead-out 101B. Coil 101 has several hundred windings and is spherical in shape to conform to the surface of damper shell 102, while having a racetrack shape when viewed from above. FIG. 13B shows the relationship between inner magnet assembly 142, coil 101, and outer magnet assembly 152 which results when inner stator assembly 140 is attached to outer stator assembly 150, as shown in FIGS. 2A and 2B, to bring inner magnet assembly 142 into active juxtaposition with outer magnet assembly 152. Coil 101, part of levitated flotor assembly 100, is free to move in the space between magnet assemblies 142 and 152.

Figure 14A:
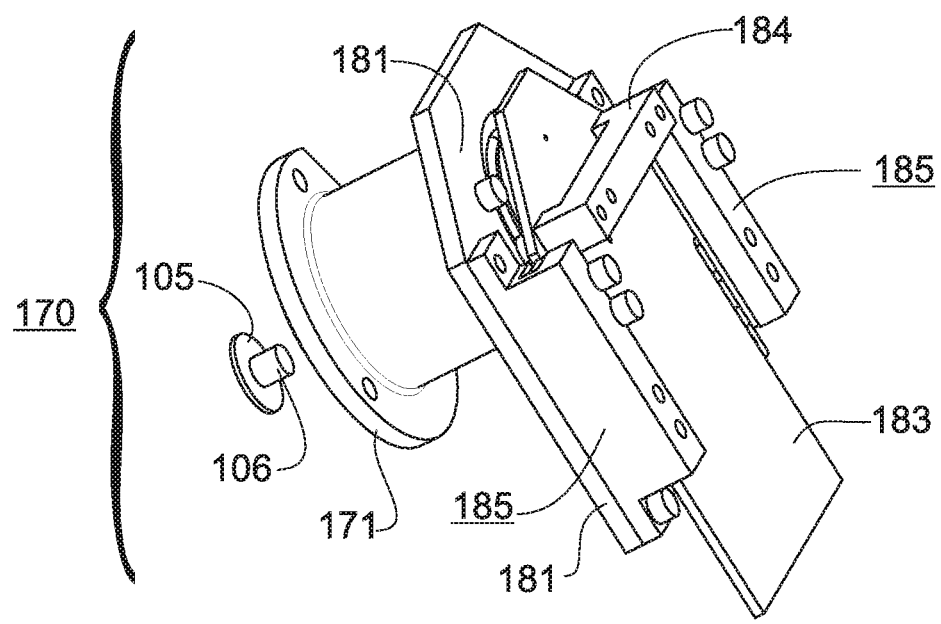
FIG. 14A is an external view of one of the optical sensor assemblies.

FIG. 14A is an external view of one of three optical sensor assemblies 170. Also shown is flotor LED 106 and its associated circuit board 105 in relationship to optical sensor assembly 170. Telescope tube 171 mounts to outer stator shell 151 by screws at hole features 151A shown in FIG. 10B. Sensor mounting plate 181 is attached to telescope tube 171 by screws 182(visible in FIG. 14B). Sensor circuit board clamp assembly 185 attaches to sensor mounting plate 181 by screws, holding sensor circuit board 183 in place. Sensor alignment bar 184 mounts on sensor circuit board 183 with screws.

Figure 14B:
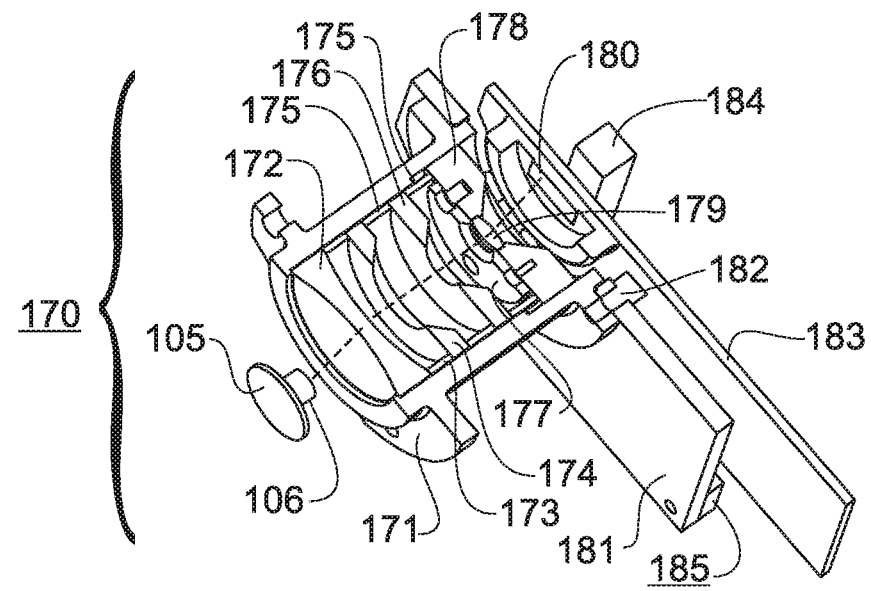
FIG. 14B is a cross-sectional view of an optical sensor assembly.

FIG. 14B shows the internal parts of sensor assembly 170. Concave lens 172 is nearest flotor LED 106. Short spacing ring 173, large optical baffle 174, tall spacer ring 175, small optical baffle 176, and a second tall spacer ring 175 constitute an ordered sequence of parts within telescope tube 171. Next in the sequence is convex lens 179, held by convex lens holder 178 and convex lens retainer 177. Lens holder 178 has external threads which mate with internal threads of telescope tube 171. Position sensing photodiode 180 is mounted on sensor circuit board 183 such that its center is aligned with the central axis of telescope tube 171.

Figure 14C:
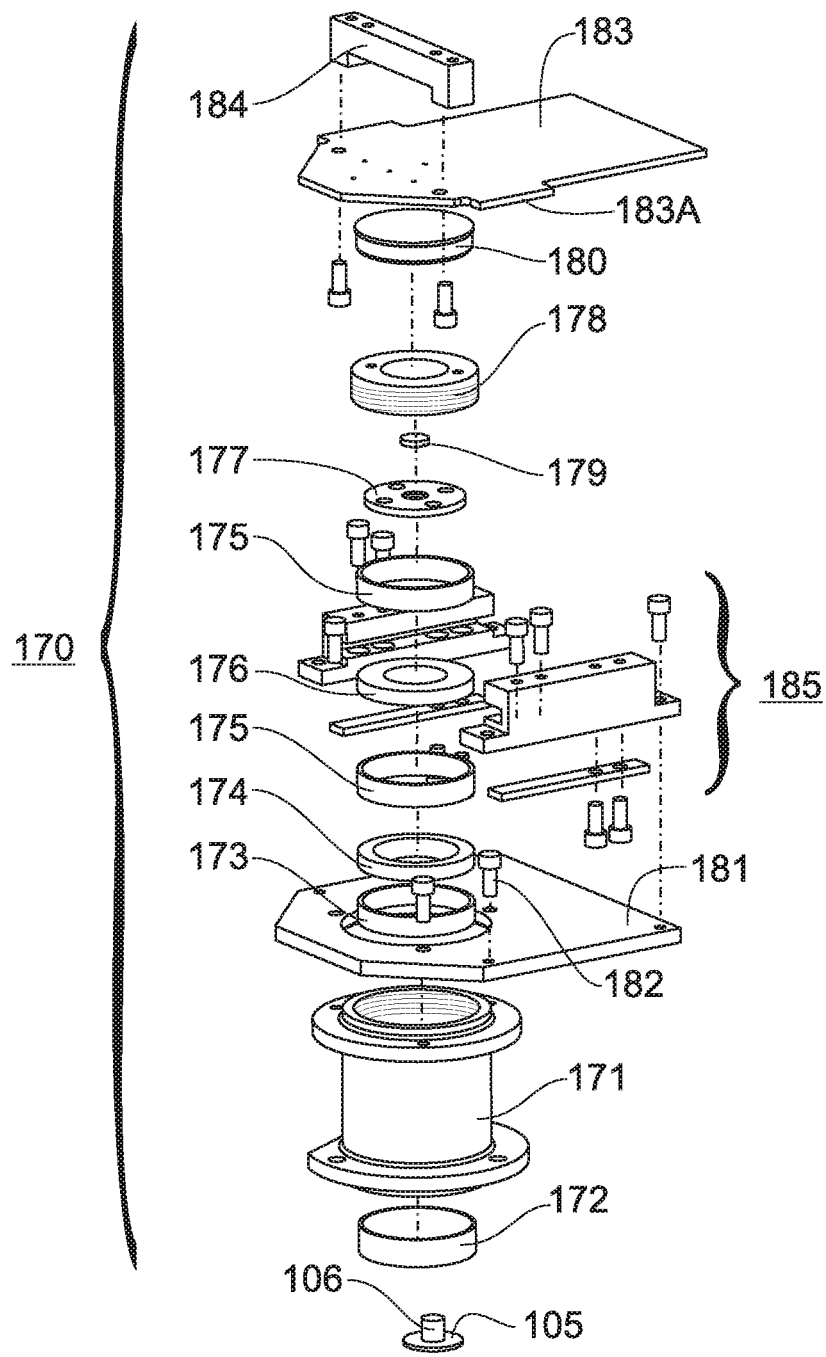
FIG. 14C is an exploded view of an optical sensor.

FIG. 14C is an exploded view of sensor assembly 170 showing the stack of parts. Top to bottom, there is sensor alignment bar 184, sensor circuit board 183, position sensing photodiode 180, convex lens holder 178, convex lens 179, convex lens retainer 177, tall spacer ring 175, small optical baffle 176, tall spacer ring 175, large optical baffle 174, short spacer ring 173, sensor mounting plate 181, telescope tube 171, concave lens 172, flotor LED 106, and LED circuit board 105. Also shown are sensor board clamp assemblies 185.

Figure 14D:
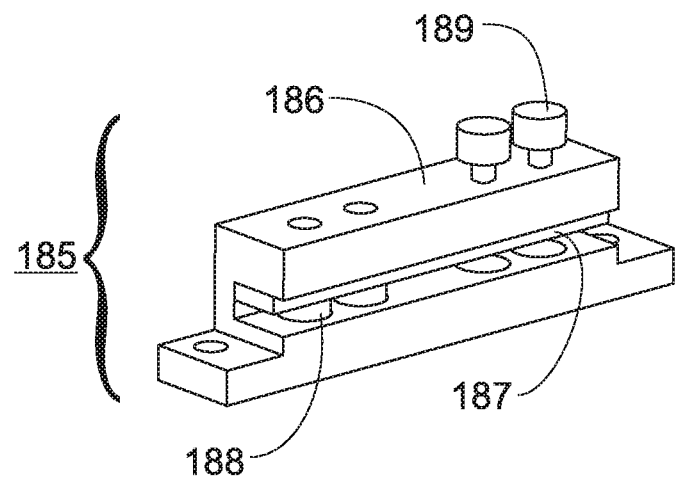
FIG. 14D shows a mechanism for adjusting and securing the alignment of a sensor.

FIG. 14D is a view of one of the two sensor board clamp assemblies 185 which are part of each sensor assembly 170. Sensor board pedestal 186 features a horizontal groove in which sensor board clamp 187 is mounted using upward-facing screws 188. Downward-facing screws 189 are positioned so as to exert downward pressure on sensor board clamp 187.

Figure 15:
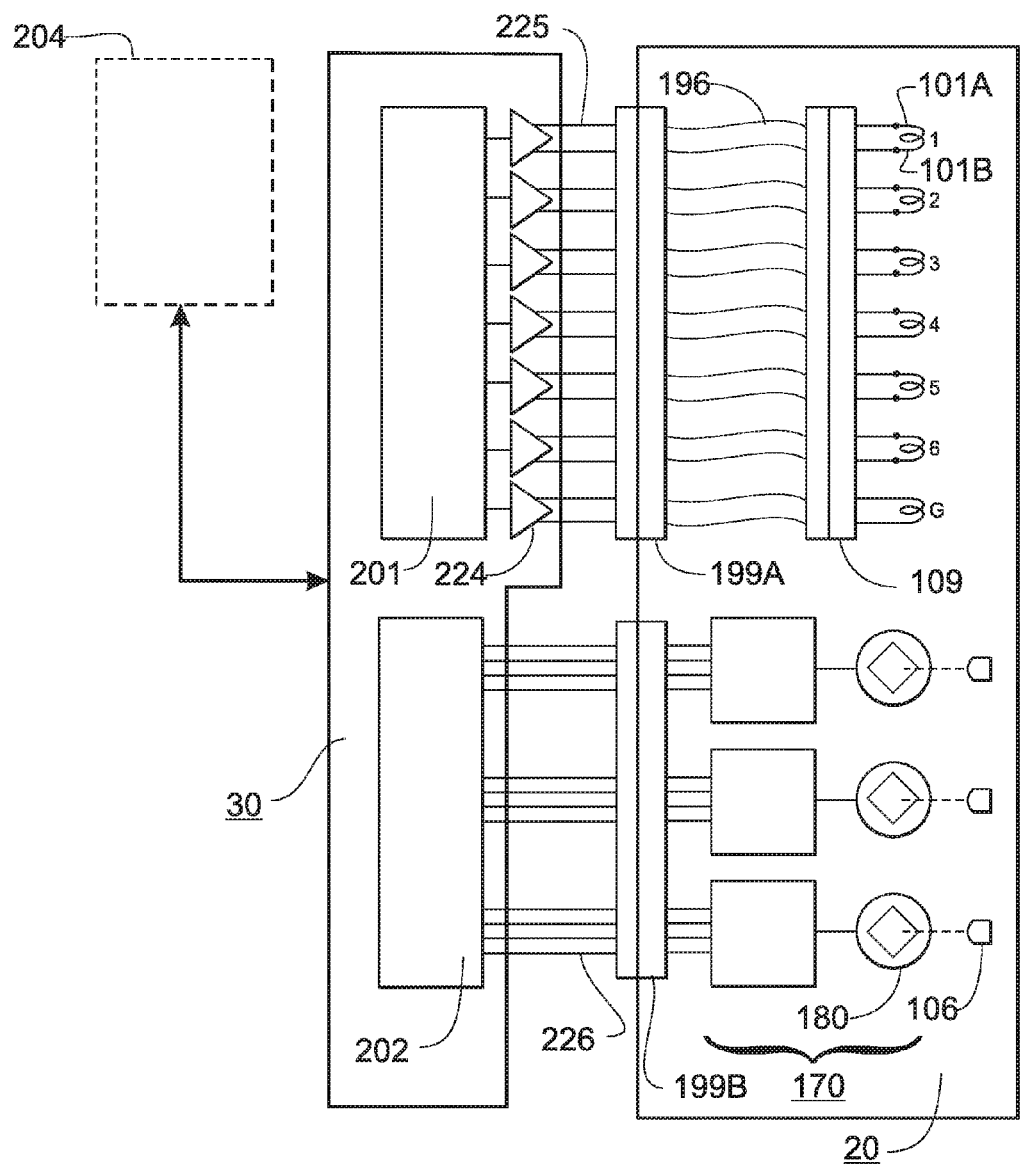
FIG. 15 is a block diagram of the invention's electronics.

FIG. 15 is a block diagram of the electronic aspect of the invention. A user's computer 204 is connected to controller 30, which incorporates a high speed computer. Controller 30 incorporates digital-to-analog (DAC) converter 201. DAC 201 is connected to amplifiers 224 incorporated in controller 30. Amplifiers 224 are connected to actuator cable 225. Actuator cable 225, which can be up to several meters in length, is connected to actuator cable connector 199A on interface circuit board 195 (omitted here for clarity) housed within device 20. Flexible wires 196 extending from interface circuit board 195 connect to flotor connector 109. Flotor connector 109 connects to inner leads 101A and outer leads 101B of each coil 101. Controller 30 likewise incorporates analog-to-digital (ADC) converter 202. ADC 202 is connected to sensor cable 226. Sensor cable 226, which can be up to several meters in length, connects to sensor cable connector 199B on interface circuit board 195 (not shown), housed within device 20, thence connecting to each of three sensor assemblies 170 having position sensing photodiodes 180 facing each LED 106 on flotor assembly 100.

Operation of the Embodiment

FIGS. 1b-23

FIG. 1B is an overview of the device part of improved magnetic levitation haptic system 10 showing handle 130. Device 20 is substantially spherical. Handle 130 can be grasped by a computer user and moved in translation over limited distances and in rotation over limited angles in six degrees of freedom (DOF). As will be explained later, motion of the handle is transmitted to the user's computer application. Conversely, forces and torques are concurrently transmitted from the user's application to handle 130, thereby enabling the user to feel computed quantities using his or her sense of touch (haptic interaction).

FIG. 1C is a lower view of the device part of invention 10 showing electrical connectors which transmit and receive electrical signals from control electronics diagrammed in FIG. 15, and thence to the user's computer. Actuator cable connector 199A receives electrical current for actuating coils 101 in flotor assembly 100, whereas sensor cable connector 199B sends position information to controller 30 from optical sensor assemblies 170.

FIG. 1D shows the device 20 portion of invention 10 resting in a circular hole in work table 201, facilitated by table mounting ring 200 which supports the weight of device 20 while, by virtue of its spherical shape, allowing it to be manually rotated to any suitable orientation by the user according to his or her preference. This important feature allows the user to rotate device 20 into a comfortable attitude, e.g., with the elbow resting on the surface of table 201, wrist resting lightly on device 20 and fingers free to move over a comfortable motion range.

FIG. 2A is a cross-sectional view showing several functional units. Flotor assembly 100, which includes handle 130, is levitated or suspended between inner stator assembly 140 and 150 by forces generated from the interaction between current flowing in coils 101 incorporated into flotor assembly 100 and fixed magnetic fields produced by permanent magnet assemblies 142 and 152 incorporated in inner stator assembly 140 and outer stator assembly 150, respectively, according to the well-known Lorentz force law F=I×B, where F is the force in Newtons (N), I is the current in Amperes (A), and B is the magnetic field in Teslas (T). The term "flotor" is used in analogy with the familiar term "rotor" of electrical motor parlance to denote the portion of the electrical apparatus which is free to move. Flotor assembly 100 is free to move about within the annular space defined by inner stator assembly 140 and outer stator assembly 150, except rotation about the central axis of flotor assembly 100 is restricted by the mechanism shown in FIG. 12. A plurality of very flexible wires 196 carry electrical currents to and from coils 101 and interface circuit board 195 by means of connector 197. Interface circuit board 195 also provides an interconnection means for optical sensor assemblies 170 (omitted in the figure for clarity) and incorporates connectors 199A and 199B leading to electronics shown in FIG. 15. Magnet cover 194, preferably made of an ABS plastic material, serves to cover magnet assemblies 142 of inner stator assembly 140, providing a functional and decorative surface upon which the user can rest his or her wrist. Alternatively, magnet cover 194 can be fashioned of high permeability μ-metal if magnetic shielding is desired. Upper and lower shells 191 and 192, both made of aluminum, serve to protect the inner parts of device 20 and provide the functional spherical shape.

FIG. 2B is an exploded view of device 20, illustrating the relationship between major assemblies such as inner stator assembly 140, flotor assembly 100, outer stator assembly 150, optical sensor assemblies 170 and other functional parts. Flotor assembly 100 has three light emitting diodes (LEDs) 106, preferably infra-red emitting, which serve as beacons which are viewed by a corresponding set of three optical sensor assemblies 170. The precise position of each LED 106 is tracked, thereby enabling, by a computational process, determination of the precise position and orientation of flotor assembly 100 with handle 130, within stator assembles 140 and 150. A triad of flexible support legs 198 connect outer stator assembly 150 and connector panel 193, to which lower shell 192 is connected, causing lower shell 192 and upper shell 191 to be pulled tightly together, serving to maintain the spherical shape of device 20.

FIGS. 3A and 3B provide views of flotor assembly 100 showing a number of features best explained by FIG. 4. Referring to FIG. 4, the components of flotor assembly 100 form a very strong, lightweight, and completely non-magnetic structure. Flotor structure 103, hemispherical in shape, is preferably molded from a strong, lightweight composite material such as carbon fiber and epoxy. Various features cut out of the structure serve to reduce weight. Six cutout features 103A serve as pockets to receive six spherically-formed electrical coils 101 arranged in the manner shown. Three hole features 103C located on the axes of an orthogonal coordinate frame whose origin is at the center of flotor structure 100 define locations for three LED beacons 106. The inside surface of thin damper shell 102 fits against the outside surface of flotor structure 103, and is bonded to it by a viscoelastic adhesive (not shown), forming a structure exhibiting mechanical properties of a constrained-layer damper, as is known in the art. In operation, damper shell 102, preferably formed from aluminum, moves within the strong permanent magnet fields produced by inner and outer magnet assemblies 142 and 152, thereby acting as a homopolar generator causing drag forces proportional to velocity, $F_d = kv$ as is known in the art, where the constant k is proportional to the thickness of damper shell 102. Six coils 101 fit within cavities 103A in flotor structure 103, and are bonded to the inside surface of damper shell 102 by a thermally-conductive epoxy (not shown). Damper shell 102 thus also serves to conduct away heat produced by coils 101. Coils 101 are preferably formed from insulated aluminum ribbon wire. Electrical leads from coils 101 extend through a hole in the bottom of flotor structure 103 and damper shell 102, terminating in connector 109, which is held in place by connector collar 108 made of aluminum. Operation of coils 101 is further discussed with reference to FIG. 13A. Three LED beacons 106, mounted on small circular circuit boards 105, protrude from the outer surface of damper shell 102, providing position and orientation reference for flotor assembly 100. The LEDs 106 are protected from possible impact with the inside surface of outer stator assembly 150 by aluminum shields 107. Aluminum stiffener ring 104 which has an annular groove in its underside, fits over the sandwiched flotor structure 103 and damper shell 102, and is held in place by epoxy adhesive (not shown). Stiffener ring 104 thus serves to greatly increase the resonant frequency of the thin bell-like structure comprised of the bonded flotor structure 103 and damper shell 102, imparting desirable mechanical properties. Handle and stem assembly 110 mounts through holes in flotor structure 103 and damper shell 102 to connector collar 108 with six (non-magnetic) brass screws (not shown), thereby forming, all together, a single lightweight rigid structure 100.

FIGS. 5A, 5B, and 5C concern stem and handle assembly 110. Willful motion of the computer user's hand is transmitted to flotor structure 103 and thence to motion of LEDs 106 through flotor stem parts 111, 112, and other small parts as shown. Conversely, forces and torques generated by the Lorentz forces in coils 101 are transmitted to the computer user's hand through parts 111, 112, and other small parts. Thus it will be appreciated that the entire structure of handle and stem assembly 110 must not twist or bend to transmit haptic information to and from the computer user's hand, i.e., it must be substantially rigid. On the other hand, within the objective of a rigid structure, it is a feature of device 20 that handles be interchangeable. With reference to FIG. 5A, parts 111, 112, and 116, all of aluminum, are permanently affixed to one another with epoxy adhesive (not shown), forming a rigid structure in contact with flotor structure 103. Handle 130 which is grasped and whose motion is controlled by the computer user subject to forces generated by coils 101, is attached to handle interface 115 by screws and other small parts, constituting a removable assembly. To attach a handle, the user rotates captured aluminum stem sleeve 113, threaded on its inner surface, engaging it with external threads of handle interface 115, serving to draw stem top 116 into tight contact with the upper inside surface of handle interface 115. Reverse rotation of stem sleeve 113 is needed to detach a handle. Stem tube 112 feature 112A serves to prevent stem sleeve 113 from falling down the length of stem tube 112 when stem sleeve 113 is disengaged from handle interface 115.

FIG. 5B is an exploded view of stem and handle assembly 110, in which the functions of various parts become more apparent. Components which remain a fixed part of flotor assembly 100 are shown in the left column, whereas components which are part of the removable handle are shown in the right column. Referring to the left column of FIG. 5B, slippery plastic sleeve washer 114 serves to prevent friction and galling as stem sleeve 113 would otherwise rotate and tighten against the mating aluminum surface of stem top 116. Large 116A and small 116B hole features in stem top 116 are designed to precisely mate with pins 120 and 117 (right column), thereby preventing appreciable rotation which would be deleterious to the operation of device 20. Socket 123 on circuit board 121 has a plurality of electrical connections which carry signals to and from the handle 130. Referring to the right column of FIG. 5B, handle interface 115, is made of a dissimilar metal (such as brass) from aluminum stem sleeve 113 to prevent galling as the two parts are engaged by means of their screw threads. Precision pins 120 and 117 made of stainless steel are pressed into holes in handle interface 115 with interference fits. Plug 122 mounted on circuit board 121 has a plurality of electrical connections to engage or disengage with socket 123 to allow electrical signals to flow or not flow as the handle is attached or removed.

FIG. 5C is an exploded view of handle 130, showing the arrangements of its internal parts. There are upper 132 and lower 131 molded plastic parts which fit together and are fastened by screws 136 and 137, providing a functional form that is easily graspable by the human hand, and which can also easily transmit torque such as that caused by rotation about the central axis of flotor assembly 100. It is recognized that the form of handle 130 is similar to that of a standard computer mouse, but it must be appreciated that a computer mouse does not have the need to transmit forces and torques as does handle 130. Plastic buttons 133 slide freely in and out of molded features of handle bottom 131. When the buttons are pressed by the computer user, they actuate electrical pushbutton snap switches 135 mounted on circuit board 134, thereby opening and closing electrical connections serving as inputs to the user's computer.

FIGS. 6A, 6B, 6C, and 6D show several alternative handle styles which can be substituted for the handle shown in FIG. 5C according to the computer user's needs. For example, the joystick type handle in FIG. 6B might functionally be better if the user's computer program was emulating flight of an airplane. The design of the pen-like handle shown in FIG. 6C allows a precision grasp, such as that needed for performing virtual (emulated) surgery with haptic feedback. The grasping type handle depicted in FIG. 6D adds the additional degree of freedom for reading thumb-forefinger pinching distance while applying a pinching force.

FIGS. 7A and 7B show an embodiment of a grasping type handle 230 which is a functional part of device 20. Motor 234 provides torque to capstan 234A, which imparts equal and opposite forces to L-shaped bars 242 and 246, operating in linear slide bearings 248, and thence to forefinger and thumb rings 240 and 244, respectively, whose action imparts pinching forces to the computer user's forefinger and thumb. Alternative transmissions include rack and pinion, friction drive, belt drive, and band drive, among others. Linear slide bearings 248 can be of the ball bearing, or crossed roller bearing type, among others. Electric current in motor 234 is controlled by digital-to-analog converter (DAC) 201 output G (see FIG. 15). Motor 234 is preferred to be of the brushed moving coil type, but other suitable motors will suffice. Feedback device 232, attached to the output shaft of motor 234, provides position information to controller 30, which is read by an auxiliary input on analog-to-digital converter (ADC) 202. A preferred position feedback device is a thin film potentiometer, but other devices will suffice. As shown in FIG. 7A, the grasping type handle mates with the flotor stem, (see FIG. 5B), in a manner which is identical to that of other handles. The grasp force, or 7th degree of freedom, is controlled by a PD control law given by $f=k_p q + k_v \dot{q}$, where f is the grasping force, q is the grasp penetration distance, $\dot{q}$ is the grasping speed, and $k_p$, $k_v$ are gains. An important consideration of this design for a grasping type handle is that inertial forces due to motion of flotor assembly 100 are equally shared by the thumb and forefinger.

FIGS. 8A and 8B show inner stator assembly 140 whose six inner magnet assemblies 142 provide one half of the magnetic circuits producing the magnetic fields B with which the coil 101 currents I interact to produce forces F, according to the Lorentz force law. Magnet assemblies 142 are in active juxtaposition with coils 101 of flotor assembly 100. Flotor stem and handle assembly 110 protrudes upward through hole feature 141A when device 20 is assembled.

FIG. 9 is an exploded view of one of the six inner magnet assemblies 142. Magnets 145, preferably of MnFeB with magnetic energy approaching 50 MgOe, are arranged with North magnetic poles (N) in opposite directions with respect to return 146, made of a highly permeable material such as furnace annealed 1018 steel or Vanadium Permendur. Return 146 serves to guide the magnetic flux from one magnet 145 to the other magnet 145 while minimizing leakage fields. Inner magnet holder 147, made of aluminum, serves as a means for mounting magnet assemblies 142 to inner stator shell 141. Inner stator shell 141 is preferably made of aluminum, but other materials such as molded plastic can be used.

FIGS. 10A and 10B show outer stator assembly 150 whose six outer magnet assemblies 152 serve to complete the magnetic circuits 152 of outer stator 150 when the magnetic circuits are in active juxtaposition as shown in FIGS. 2A and 2B. Flotor flexible wires 196 extend downward through hole feature 151C when device 20 is assembled.

FIG. 11 is an exploded view of one of the six outer magnet assemblies 152. As in the inner stator assembly, magnets 156, preferably of MnFeB with magnetic energy approaching 50 MgOe, are arranged with North magnetic poles (N) in opposite directions with respect to return 157, made of a highly permeable material such as furnace annealed 1018 steel or Vanadium Permendur. As in the inner stator assembly, return 157 serves to guide the magnetic flux from one magnet 156 to the other magnet 156 while minimizing leakage fields. Outer magnet holder 158, made of aluminum, serves as a means for mounting magnet assemblies 152 to outer stator shell 151. Outer stator shell 151 is preferably made of aluminum, but other materials such as molded plastic can be used.

FIG. 12 is an overhead view of flotor assembly 100 in its position inside outer stator assembly 150, with inner stator 140 removed to allow viewing. Motion of flotor assembly 100 is limited to the annular space between inner stator assembly 140 and outer stator assembly 150, but would be capable of arbitrary rotation about its central axis if it were not for string loops 75, which constrain the motion, preventing flotor coils 101 from becoming misaligned with their respective magnet assemblies 142 and 152. Likewise, arbitrary rotation about the central axis would cause flotor LEDs 106 to go out of range of their corresponding optical sensors 170. Finally, flotor flexible wires 196 would twist up and break if the computer user were to rotate flotor assembly 100 too far. For all these reasons, it is a feature of device 20 to limit flotor rotation. FIG. 12 shows flotor assembly 100 rotated clockwise as shown by the arrow, to an angle near the limit as defined by string loops 75. The material of string loops 75 is preferably Kevlar, but other strong, flexible, and light string can be used. In normal operation when string loops 75 are slack, their influence on flotor motion is negligible.

FIG. 13A shows one of the six coils 101 which are an integral part of flotor assembly 100. Coils 101 are wound with thin, flat insulated ribbon, preferably of aluminum, which allows a large number of turns carrying maximum current. Coils 101 are wound in a racetrack shape where wires in the mid-section are substantially straight before turning around the ends in a semicircle. Yet the shape of coils 101 must also conform to the spherical surface of damper shell 102 to which they are bonded. Current I may enter outer lead 101B, make several hundred turns, and exit from inner lead 101A. Alternatively, the direction of current I is reversed.

FIG. 13B shows one of six active juxtapositions of coil 101, inner magnet assembly 142, and outer magnet assembly 152. Here it is seen that one of six inner and outer magnet assemblies 142 and 152, whose relationship is fixed by inner and outer stator assemblies 140 and 150, forms a closed magnetic loop with high magnetic field B in which coil 101 is immersed. Coil 101, being part of flotor assembly 100 is free to move in all six degrees of freedom within the magnetic gap formed by magnet assemblies 142 and 152. Current I flowing in coil 101, indicated in the figure by the dashed arrowed path, interacts with the magnetic field B such that a force is generated at right angles to both, as is well known. The resulting force is substantially in the plane of coil 101, with allowance taken for its curved form. It is understood that device 20 has six such coil/magnet groupings, which acting together produce six independent forces on flotor assembly 100.

FIG. 14A is an external view of one of three optical sensor assemblies 170. Each sensor assembly mounts in a large hole feature 151A in outer stator shell 151, oriented along the axes of an orthogonal coordinate frame whose origin is at the center of the hemispherical outer stator shell 151. When flotor assembly 100 is at its neutral position and orientation, each of three LEDs 106 on flotor assembly 100 will be aligned with the optical axis of each sensor assembly 170. In general, however, since flotor assembly 100 can be in an arbitrary position and orientation (within limits), LEDs 106 will range over a large region opposite each sensor assembly 170. Operation of device 20 depends critically on the ability of sensor 170 to track LED 106 accurately over a wide area.

FIG. 14B is a cross-section of sensor assembly 170. The optical components constitute a telescope which forms an image of LED 106 on lateral effect position sensing photodiode 180. Large concave lens 172 serves to gather light from LED 106 even if LED 106 is far from the optical axis of sensor assembly 170, directing its light into smaller convex lens 179, where it is imaged on photodiode 180. Large and small apertures 174 and 176 serve to trap unwanted scattered light from reaching photodiode 180. As is well known in the art, position sensing photodiode 180 is a PIN photodiode with a resistive layer and four gold edge electrodes. Measured photocurrents in the four electrodes are used to determine the position of the centroid of an image falling on the photodiode. As is well known, such diodes suffer from a nonlinearity known as pin cushion distortion. On the other hand, the wide-angle view afforded by the combination of concave lens 172 and convex lens 179 suffers from the opposite nonlinearity, known as barrel distortion. Thus, a feature of optical sensor assembly 170 is that these two types of nonlinearity partially cancel each other, yielding a more linear position output.

FIG. 14C is an exploded view of sensor assembly 170, which more clearly shows the sequence of how the parts stack together. Here it is seen that telescope tube 171, made of aluminum, has internal threads which mate with convex lens holder 178, capturing large and small apertures 174 and 176, and spacer rings 173 and 175, to form a compact design where the parts are all held in a certain fixed arrangement. FIG. 14C also shows sensor alignment bar 184, which fastens by screws to sensor circuit board 183. It is easily recognized that due to various manufacturing tolerances associated with lenses 172 and 179, position sensing photodiode 180, and components on circuit board 183, it will be unlikely that the electrical origin or center of position sensing photodiode 180 will fall on the optical axis of sensor assembly 170. Therefore, alignment bar 184 is designed to temporarily attach to a precision x, y, z, $\theta_z$ motion stage which can be used to accurately adjust the position and orientation of circuit board 183 carrying photodiode 180. This procedure is conducted by monitoring output voltages from sensor board 183 during adjustment until x and y outputs are substantially zero, and the photodiode axes are aligned with the coordinate frame previously discussed. When the adjustment is complete, sensor clamp assembly 185 is used to clamp circuit board 183 firmly in place, after which the precision stage is de-attached from sensor alignment bar 184.

FIG. 14D shows one of two sensor clamp assemblies associated with each of three sensor assemblies 170. Each sensor pedestal 186 has a groove in its side which accepts sensor board tab features 183A. Flexible clamp cantilever 187, preferably made of composite material such as FR4 glass-epoxy, is held in place by clamp screws 188. Screws 189 press down on cantilever 187, and hence on sensor board tab features 183A to securely fix circuit board 183 firmly in place.

FIG. 15 is a block diagram of the electronic aspects of invention 10. The computer user's computer 204 connects by a serial link, preferably Ethernet, Firewire, or USB 2.0 to controller 30, providing high-speed two-way communication between invention 10 and the computer user's program. Controller 30 has plug-in digital-to analog (DAC) board 201 and analog-to-digital (ADC) board 202, communicating at high speed on the main bus of controller 30. DAC 201, preferably of at least 12-bit precision, outputs 7 voltages which are fed to amplifiers 224. Amplifiers 224, preferably of linear type, but can also be of pulse width modulation (PWM) type, are configured to produce currents I in each of six flotor coils 101 through flexible wires 196. Additionally, current denoted by coil G is output for an optional grasping actuator. Light from each of three LEDs 106, preferably of infra-red type, which are part of flotor assembly 100 are imaged on three position sensing photodiodes 180 which are part of sensor assembly 170. As is well known, the image on each photodiode generates photocurrents in each of its four electrodes. The photocurrents are converted to voltages by well-known circuitry on sensor circuit board 183, which are subsequently read by ADC 202, preferably of at least 16-bit precision. It is to be noted that actuator and sensor cables 225 and 226 both of which can be up to several meters in length, permit controller 30 to be positioned at a distance from device 20, according to the computer user's discretion; an important feature of invention 10 (see FIG. 1A). In typical operation, currents are output and voltages are read several thousand times per second.

Figure 16:
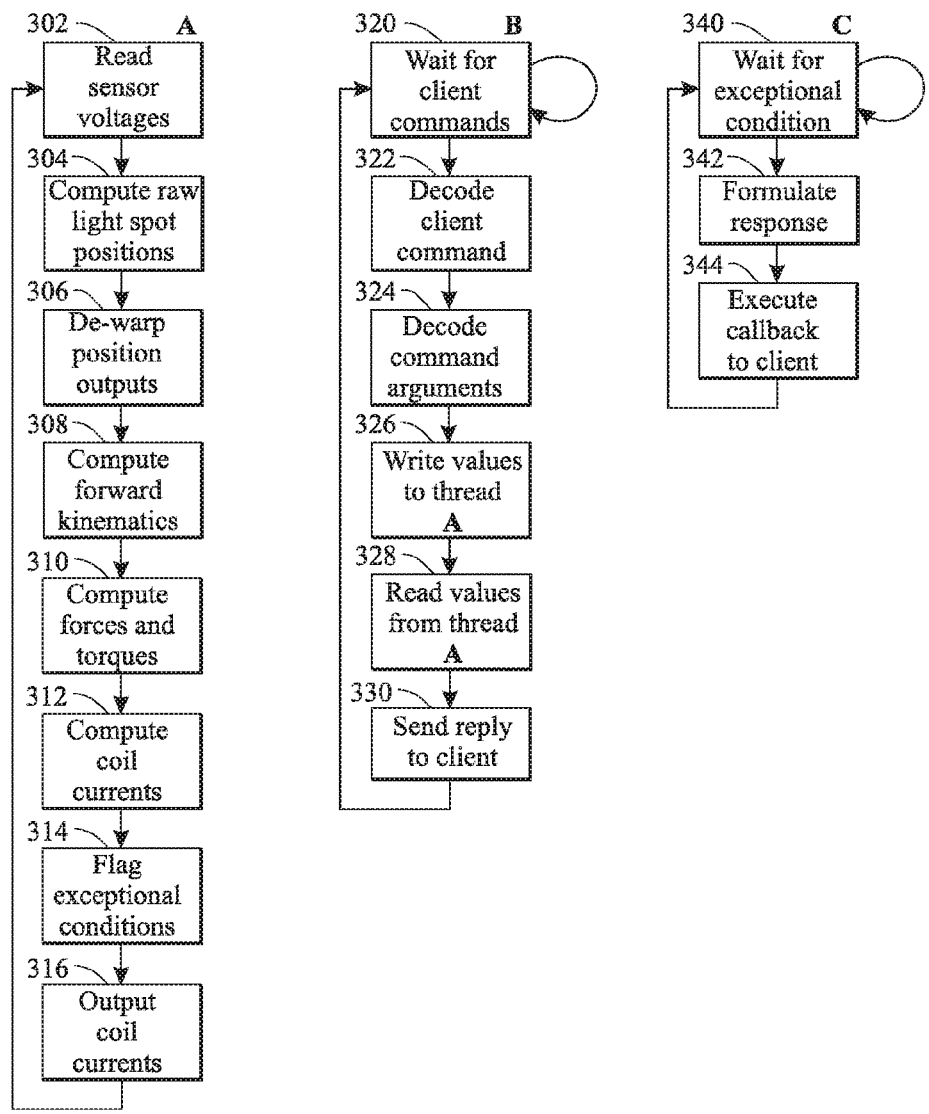
FIG. 16 is a flow chart illustrating the operation of the controller portion of the invention.

FIG. 16 is a procedural representation of the step-by-step (server) operations which are performed by controller 30 to enable operation of the invention. There are three threads operating asynchronously. Thread A is the main thread, which executes in a loop which never stops. Thread B is the communication thread which communicates with the computer user's (client) computer. Thread C handles exceptional conditions. Each thread can operate in a loop of several KHz frequency. Actual details of these threads are complicated as they can be implemented in a number of different ways. What is important is the general structure which is discussed in the following for each functional block.

Execution of Thread A

Thread A, block 302 reads twelve sensor voltages from ADC 202 (see FIG. 15). Thread A, block 304 computes LED 106 image position on each of three position sensing photodiodes 180 A, B, and C, by dividing the difference in voltages from the x-axis electrodes by the sum of voltages from the x-axis electrodes. This procedure reduces the affect of changing LED brightness, as is well known in the art. The same calculations are performed for the y-axis electrodes, yielding the raw x, y positions of the light spots.

Figure 17A:
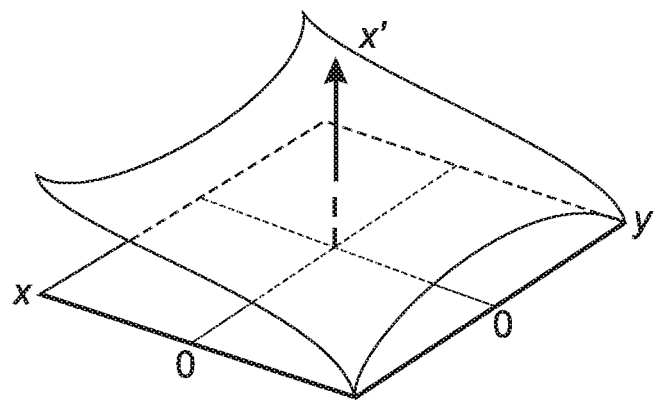
FIG. 17A depicts the nonlinear output from the optical sensors.
Figure 17B:
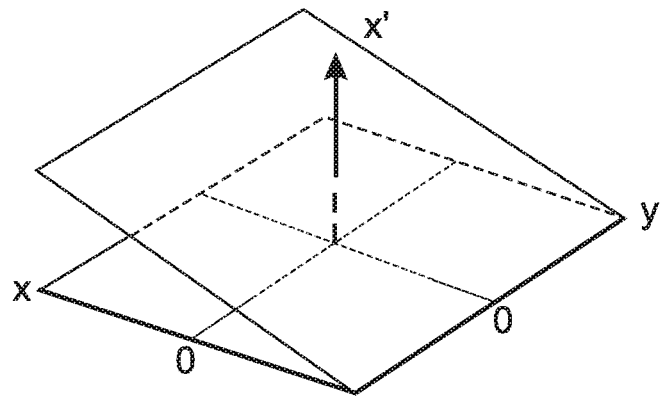
FIG. 17B shows the corrected linear output from the optical sensors.

FIG. 17A schematically illustrates results of the computations of Thread A, block 304. It is seen that despite the partial offsetting of position sensing photodiodes 180's pincushion distortion with barrel distortion of lens combination 172 and 179, there remains residual pincushion distortion. FIG. 17A shows a warped surface representing the calculated position $x^1$ of the LED image as a function of its true x and y position on the surface of photodiode 180. Near x=y=0, the output is substantially linear, but near the photodiode's corners, the calculated $x^1$ value is significantly affected by its position along the y axis. The same occurs for the measurement of the $y^1$ component of image position, i.e., the calculated $y^1$ value is significantly affected by its position along the x axis. To counter this effect, and to make use of a substantial area of the sensing surface of photodiode 180, block 306 implements a function that is the inverse of the warped surface shown in FIG. 17A. After this function is applied to the data, the surface shown in FIG. 17B results. Note that the function (and its inverse) is antisymmetric about the x=0 axis and symmetric about the y=0 axis. In practice, a preferred method is to implement the de-warping function as a large table of values, and to use bi-linear interpolation to extract approximate values between data points. A table that is 100×100 is found to be adequate.

Figure 18A:
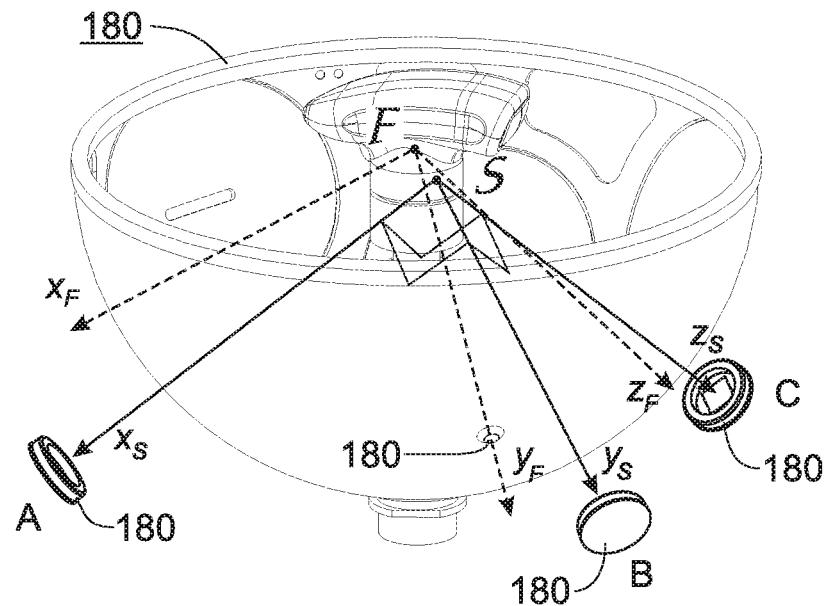
FIG. 18A shows coordinate frames associated with the flotor and stators.

Referring to FIG. 16 again, Thread A block 308 computes the forward kinematics of flotor assembly 100. That is, given the de-warped positions of LED 106 images on the three position sensing diodes 180, the task is to calculate the position and orientation of the handle 130 grasped by the computer user. There is no exact analytical solution to this problem, but an iterative numerical technique has been found which works extremely well. To explain how this may be done, it is first necessary to understand in greater detail the three-dimensional geometric relationship between flotor assembly 100 and the three sensor assemblies 170. FIG. 18A shows flotor assembly 100 and the three position sensing photodiodes 180, labeled A, B, and C, which are the sensing part of sensor assemblies 170. An orthogonal right-handed coordinate frame $\mathcal{F}$ (called the flotor frame) with origin near handle 130 on the flotor assembly's central axis, has axes $x_F$ passing through LED A, $y_F$ passing through LED B, and $z_F$ passing through LED C. The three LEDs are in juxtaposition with position sensing diodes A, B, and C, respectively. On the other hand, there is a similar, fixed orthogonal right-handed coordinate frame $\mathcal{S}$ (called the stator frame) whose three axes pass through the centers of the three position sensing photodiodes. It is important to note that when flotor assembly 100 is precisely at its zero position and orientation between inner stator assembly 140 and outer stator assembly 150, the flotor frame $\mathcal{F}$ and stator frame $\mathcal{S}$ are coincident.

Figure 18B:
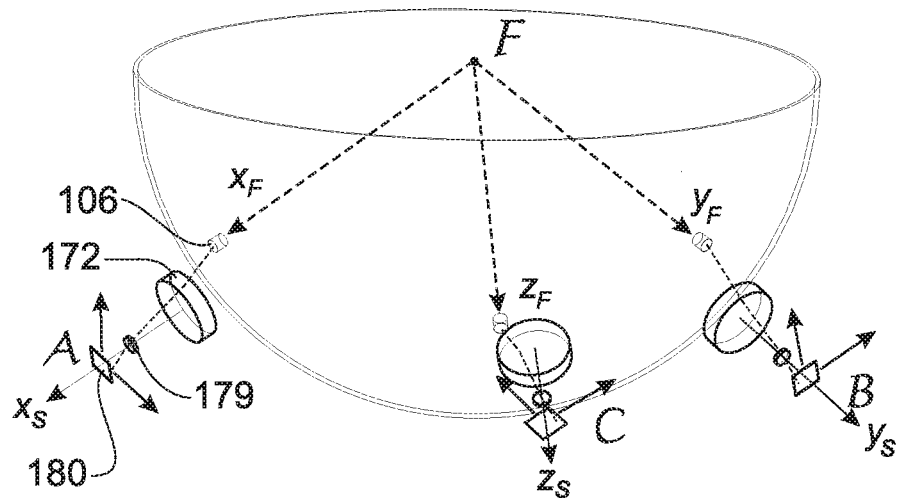
FIG. 18B shows coordinate frames associated with the optical sensors.

FIG. 18B, which is rotated from FIG. 18A, illustrates how images from LED 106 are formed on position sensing photodiode 180 by lenses 172 and 179, acting in series. When flotor frame $\mathcal{F}$ coincides with stator frame $\mathcal{S}$ rays from each LED 106 pass along the optical axis of each of the corresponding sensor assemblies 170. Position sensing photodiodes A, B, and C have associated right-handed orthogonal sensing coordinate frames $\mathcal{A}, \mathcal{B}$, and $\mathcal{C}$. Thus it is apparent that when frame $\mathcal{F}$ is coincident with $\mathcal{S}$, the centroids of the images of the LEDs will fall at the origins of frames $\mathcal{A}, \mathcal{B}$, and $\mathcal{C}$, whose position outputs will thus be zero. If, on the other hand, frame $\mathcal{F}$ is translated and rotated with respect to frame $\mathcal{S}$, light rays from the LEDs will no longer be paraxial as shown by the dashed lines in FIG. 18B, and the position outputs will be non-zero. To better understand the sensor geometry, refer to FIG. 19A which shows LED 106, concave lens 172, convex lens 179, and photodiode 180 with the LED aligned on the optical axis. The origin of the fixed stator frame $\mathcal{S}$, momentarily at the center of the hemispherical flotor damper shell 102, is also shown. Dimensions needed for performing the forward kinematics calculation of thread A, block 308 shown in FIG. 16, include the flotor radius $r_F$, distance $l_t$ from origin of frame $\mathcal{S}$ to photodiode 180, and distance $l_l$ from origin of frame $\mathcal{S}$ to the location of a virtual pinhole, marked in the figure by a small dot. The virtual pinhole conceptually replaces the geometric effects of the lenses. Also shown is the distance $l_z$ from the virtual pinhole to the photodiode 180. It is thus recognized from geometric optics that $l_l-r_F$ is the "object distance," whereas $l_t$ is the "image distance."

Figure 19A:
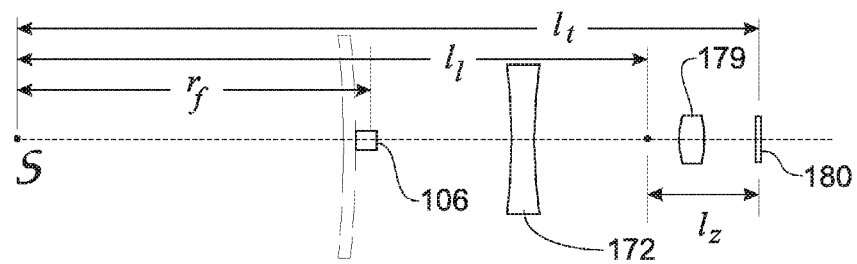
FIG. 19A is a detail of an optical sensor.
Figure 19B:
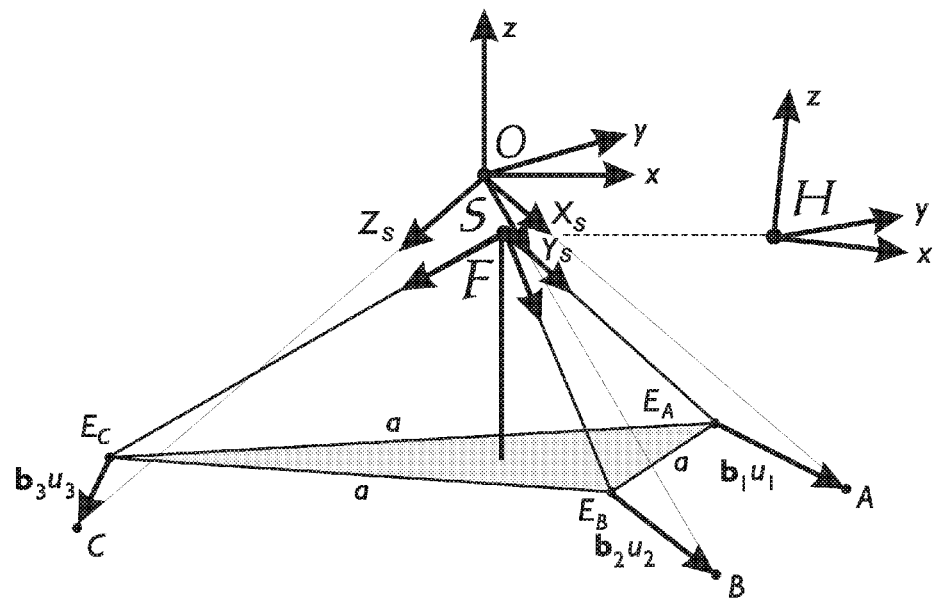
FIG. 19B is an abstract diagram to illustrate the principles of the optical sensing.

FIG. 19B is an abstraction of FIG. 18B, with a laboratory or world frame $\mathcal{O}$ and flotor frame $\mathcal{F}$ shown displaced from stator frame $\mathcal{S}$. Also shown is handle frame $\mathcal{H}$, shown displaced from the origin of flotor frame $\mathcal{F}$ for clarity. Frame $\mathcal{F}$ is rigidly connected with the triangular base (shown in gray) to which LED emitters $E_A$, $E_B$, and $E_C$ are attached. Finding the image positions is equivalent to finding each of the vectors between the LEDs and the corresponding virtual pinholes associated with sensors A, B, and C. This is accomplished by using the transformation matrix $_f^sT$, which describes the flotor assembly's motion. For example, for LED A (emitter $E_A$), with the constant vector $^fA$ (the location of LED A with respect to the flotor frame) and the constant transformation matrix $_s^aT$, this is given by $$^aA = {_s^aT} {_f^sT} {^fA}. \quad (1)$$

The light source is imaged on photodiode A at a point $(s_{a,x}, s_{a,y})$ given by the lens equation $$\begin{bmatrix} s_{a,x} \\ s_{a,y} \end{bmatrix} = \left( \frac{-l_z}{\{^aA\}_z} \right) \begin{bmatrix} \{^aA\}_x \\ \{^aA\}_y \end{bmatrix}, \quad (2)$$

where, as noted above, $l_z$ is the distance from the virtual pinhole to the photodiode.

Before computing the forward kinematics, it is instructive to note that the inverse kinematics must be a function of six independent variables describing the position and orientation of the flotor frame $\mathcal{F}$ with respect to the stator frame S. The representation used is $\{n_1\ n_2\ \theta\ X\ Y\ Z\}$, where $n_1$ and $n_2$ represent the x and y components of a normalized rotation axis, $\theta$ the rotation angle about this axis, and X, Y, and Z the translational motion of the origin of $\mathcal{F}$. Creating $_f^sT$ as a function of these six variables plus $n_3$ (the z component of the rotation axis) and computing $s_{a,x}$ and $s_{a,y}$ from Eqs. (1), (2) above gives the LED image position on photodiode A:

$$s_{a,x} = \frac{l_z l_l [n_1 n_3 (1 - \cos\theta) - n_2 \sin\theta] + Z}{l_l [n_1^2 + (1 - n_1^2)\cos\theta] + X + l_z - l_t}, \quad (3)$$

and $$s_{a,y} = \frac{l_z l_l [n_1 n_2 (1 - \cos\theta) - n_3 \sin\theta] + Y}{l_l [n_1^2 + (1 - n_1^2)\cos\theta] + X + l_z - l_t}, \quad (4)$$

where $l_l$ is the distance from the origin of S to the pinhole and $l_t$ the distance from the origin to the photo-diode surface. Similar computations obtain for sensors B and C.

Unfortunately, computing the forward kinematics, (i.e., finding the flotor position and orientation from the light spot positions) has no closed-form solution. A preferred method, termed the reduced order method, due to Yu, Fries, and Hollis, is a fast numerical root-finding procedure that uses the flotor assembly motion history to obtain initial position guesses, directly solving for the flotor frame $\mathcal{F}$ position and orientation in real time. Referring to FIG. 19B, the directions of the three vectors from the emitters to the virtual pinholes are known; i.e., they can be readily computed from the measured image positions on the photodiodes, and the (fixed) transformations of the sensor frames $\mathcal{A}, \mathcal{B}$, and $\mathcal{C}$ from the stator frame $\mathcal{S}$. Only the magnitudes of the vectors are unknown, so the solution of the position and orientation of the flotor assembly can be reduced to a third-order problem. The virtual pinhole positions are given by $S_i$, and the LED positions are $E_i$; the LED-to-pinhole unit vector directions are $b_i$ and their magnitudes are $u_i$, where $i=1 \ldots 3$.

For $i, j=1 \ldots 3$ and $i \neq j$ it can be seen from FIG. 19B that $$E_i = S_i - b_i u_i, \tag{5}$$

and $$|E_i - E_j|^2 = a^2, \tag{6}$$

where a is the length of each side of the triangle determined by the three LEDs. Substituting for each $E_i$ and $E_j$ in Eqs. (5) and (6), the following system of three quadratic equations with three unknowns is obtained:

$$u_1^2 + 2g_3 u_1 u_2 + u_2^2 + 2f_{12} u_1 + 2f_{21} u_2 + d^2 = 0, \tag{7}$$

$$u_2^2 + 2g_1 u_2 u_3 + u_3^2 + 2f_{23} u_2 + 2f_{32} u_3 + d^2 = 0, \tag{8}$$

and $$u_3^2 + 2g_2 u_3 u_1 + u_1^2 + 2f_{31} u_3 + 2f_{13} u_1 + d^2 = 0, \tag{9}$$

where $$g_k = -b_i \cdot b_j, \tag{10}$$

$$f_{ij} = (S_i - S_j) \cdot b_i, \tag{11}$$

and $$d^2 = |S_i - S_j|^2 - a^2 < 0. \tag{12}$$

To obtain a solution to this reduced third-order problem, a two-stage numerical method is used, first obtaining an approximate solution by differentiating Eqs. (7)-(9) to update $u_i$ using the previous solution values, then improving the accuracy of the approximation with an efficient iterative Newton gradient method using successive LU decompositions, which are well known in the art. In practice, it is found that two or at most three iterations are needed to converge to a position error of less than $10^{-8}$ m, permitting this procedure to be executed at several thousand Hz. Finally, a simple fixed rotation transformation is needed to transform from the flotor frame $\mathcal{F}$ to the handle frame $\mathcal{H}$ (shown offset in FIG. 19B) which is easier to visualize. In operation, handle frame $\mathcal{H}$ (will be translated from frame $\mathcal{O}$ by a distance limited by the gap between inner stator assembly 140 and outer stator assembly 150, and rotated with respect to frame $\mathcal{O}$ by up to ±8°, limited by the effective range of sensor assemblies 170. This completes the description of how the position and orientation of handle 130 in flotor assembly 100 is computed.

Turning back to FIG. 16, Thread A, block 310, desired forces and torques to be exerted on flotor assembly 100, and thereby handle 130, grasped by the computer user, are computed. Simple control laws such as PD (proportional-derivative) can be used to stably levitate and control the motion of the handle. Translational control is straightforward. For rotation, it is easiest to represent the handle's orientation about a given center of motion with Euler angles such as roll, pitch, and yaw or $(\theta, \phi, \psi)$ as the three independent rotational variables to be controlled. If small angles and angular velocities are assumed, then the flotor assembly's dynamics can be modeled as six decoupled second-order systems. Given these approximations, the PD control law used for each axis is of the form $f = -K_p(x - x_d) - K_v(v - v_d) + K_f$, where f is the force to be generated by the actuator coils; x and $x_d$ are the measured and desired handle position, respectively; v and $v_d$ are the derived and desired handle velocities, respectively; and $K_p$, $K_v$, and $K_f$ are the proportional gains, damping gains, and feed-forward gains, respectively. Since velocity v is not directly measured, it must be estimated from successive filtered position measurements or from an observer. Feed-forward term $K_f$ is generally used for gravity cancelation and can also be used for impacts and other forces in a virtual environment. The total force F to be applied to the flotor handle is equal to the vector sum of the forces along the axes of handle frame $\mathcal{H}$ whereas the total torque $\tau$ is the vector sum of the torques around the axes of $\mathcal{H}$. The variables $x_d$, and $v_d$, and the parameters $K_p$, $K_v$, and $K_f$, are under control of the computer user's client computer, as read in by thread B shown in FIG. 16.

Figure 20A:
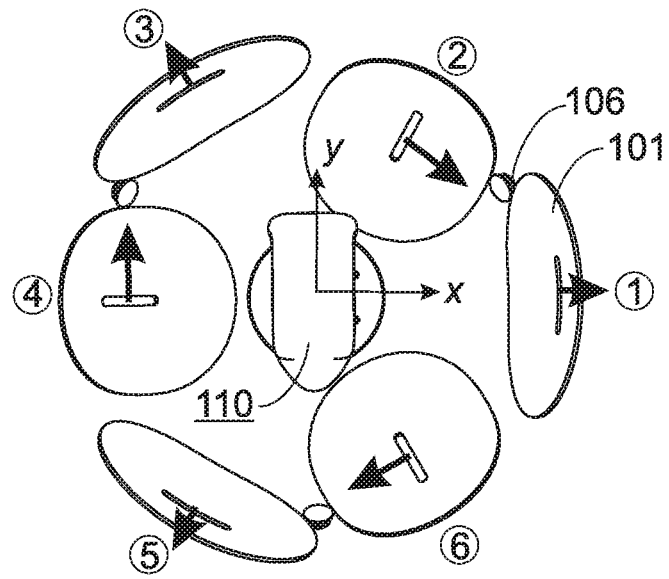
FIG. 20A is a top view showing the actuating coils and how they operate.
Figure 20B:
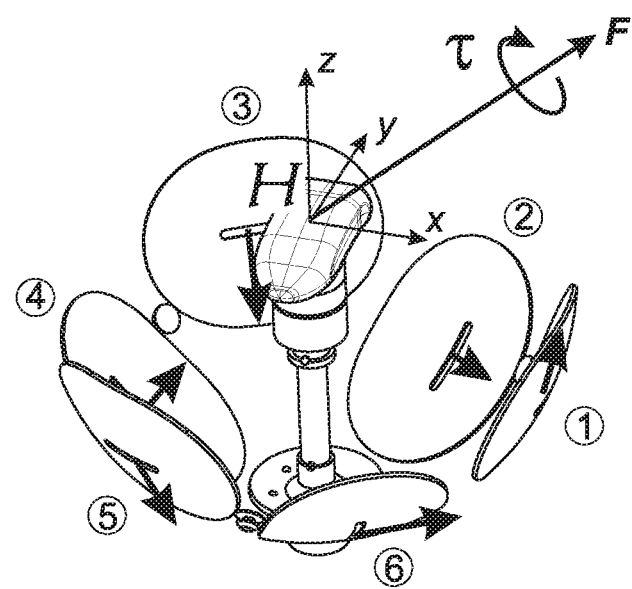
FIG. 20B is a side view illustrating the actuation principles.

Referring to FIG. 16, the next step in Thread A is block 312. Here, the commanded force F and torque $\tau$ are used to compute the correct currents $I_1, \ldots, I_6$ in the six coils of flotor assembly 100. FIG. 20A shows six coils 101 and handle and stem assembly 110 of flotor assembly 100, with all other parts removed for clarity. Also shown for reference are three LEDs 106. There are three horizontal coils numbered 1, 3, and 5, and three vertical coils numbered 2, 4, and 6. It must be emphasized that whereas this non-limiting arrangement of coils is preferred, many other arrangements are also possible. As depicted in FIG. 20A, it can be readily appreciated that equal currents $I_2, I_4$, and $I_6$ in the vertical coils create forces as shown which impart a clockwise torque about the handle frame $\mathcal{H}$'s z axis; reversing the direction of current imparts a counter-clockwise torque. Equal currents $I_1, I_3$, and $I_5$ in the horizontal coils create a force along the positive or negative z axis. In the general case, currents in each of the coils will each be different, as sketched in FIG. 20B, creating forces of different magnitudes in six different directions. The six forces are equivalent to a single force F and torque $\tau$ acting through the center of flotor assembly 100 at handle assembly 110, commonly expressed as a 6-vector "wrench," $F = (F_x, F_y, F_z, \tau_x, \tau_y, \tau_z)$ where the first three elements are force components and the last three elements are torque components.

The forces and torques generated on the handle when the flotor assembly is in the centered position can be expressed as $F = AI$, where F is a 6-vector force-torque wrench exerted through the origin of handle frame $\mathcal{H}$, I a 6-vector of the coil currents, and A is the 6×6 actuation matrix which maps them. The matrix A can be calculated from the sums of the Lorentz forces and torques, $f_k = I_k \times B_k$, and $\tau_k = c_k \times f_k$, where $B_k$ are the magnetic fields of each actuator magnet assembly and $c_k$ are vectors from the handle (origin of frame $\mathcal{H}$) to the coil centers. The effective magnetic induction $B_k$ acting on coil k varies as much as 15% as the coil moves around in the gap of its associated magnet assemblies (see FIG. 13B). In principle, it is possible to calculate $B_k$ for all positions and orientations of the coil, but in practice it is found sufficient to consider the field $B_k$ to be a constant B which is the same for all coils. Under this assumption, matrix A is the product of a purely geometric 6×6 matrix G and the scalar B, which is the average strength of magnetic induction in the air gaps of the magnet assemblies. For the coil arrangement shown in FIGS. 20A and 20B, G is given by $$\begin{pmatrix} -S(\frac{-\pi}{8}) & -S(\frac{\pi}{3}) & -C(\frac{2\pi}{3})S(\frac{-\pi}{8}) & 0 & -C(\frac{4\pi}{3})S(\frac{-\pi}{8}) & -S(\frac{5\pi}{3}) \\ 0 & C(\frac{\pi}{3}) & -S(\frac{2\pi}{3})S(\frac{-\pi}{8}) & -1 & -S(\frac{4\pi}{3})S(\frac{-\pi}{8}) & C(\frac{5\pi}{3}) \\ C(\frac{-\pi}{8}) & 0 & C(\frac{-\pi}{8}) & 0 & C(\frac{-\pi}{8}) & 0 \\ 0 & -C(\frac{\pi}{3})S(\frac{-\pi}{4}) & S(\frac{2\pi}{3}) & S(\frac{-\pi}{4}) & -S(\frac{4\pi}{3}) & -C(\frac{5\pi}{3})S(\frac{-\pi}{4}) \\ -1 & -S(\frac{\pi}{3})S(\frac{-\pi}{4}) & C(\frac{2\pi}{3}) & 0 & C(\frac{4\pi}{3}) & -S(\frac{5\pi}{3})S(\frac{-\pi}{4}) \\ 0 & -S(\frac{-\pi}{4}) & 0 & -S(\frac{-\pi}{4}) & 0 & -S(\frac{-\pi}{4}) \end{pmatrix},$$

where S and C are sine and cosine, respectively.

The task of thread A, block 312 is thus to determine the correct set of coil currents needed to produce the desired force-torque wrench F on the handle. Since matrix G has an inverse, the coil currents are simply calculated from $I=G^{-1}F/B$.

Referring to FIG. 16, the next step in Thread A is block 314. Here, a number of tests are made to determine whether there are any exceptional conditions. These include the handle hitting a pre-defined motion limit, excessive speed, excessively high coil currents for too long a period of time which could cause damage, or excessively high coil temperature (estimated from a thermal model which tracks and integrates coil currents). If these conditions are triggered, immediate actions can be taken to mediate them, and exception flags are set which are monitored by thread C shown in FIG. 16.

Referring to FIG. 16, the next step in Thread A is block 316. Here, the computed coil currents from block 312 are output to digital-to-analog converter DAC 201 (see FIG. 15). This completes the discussion of Thread A.

Execution of Thread B

FIG. 16, Thread B enables controller 30 to communicate with the computer user's client computer 204 (see FIG. 15). It operates at a lower priority than Thread A, stealing time during brief periods when Thread A is not otherwise occupied. Block 320 loops waiting for commands to come from the client computer. Following well-known practice, an Application Programming Interface (API) is incorporated in controller 30. The API provides a collection of commands that can be used by the computer user's client computer program to control the operation of the invention, and to query it for status information. The API commands have the form ml_C (a1, . . . , an) where ml_ is an arbitrary prefix denoting that the command pertains to the invention, C is one of a set of command names expressed as a string of ASCII characters, and (a1, . . . , an) is a list of argument variables. For example, ml_ReadPosition (*position) reads the handle's current position and orientation from Thread A and places it in the client's 6-vector position. In another example, ml_ApplyWrenchAll (*wrench) takes the client's 6-vector force-torque wrench and sends it to Thread A where it will cause a force-torque wrench to be applied to the handle.

FIG. 16, Thread B, block 322 decodes the client's command C in order to decide what type of action to take, following well-known practices. Similarly, block 324 decodes the arguments (a1, . . . , an) associated with the command. Block 326 writes the decoded argument values into memory where they can be accessed and acted upon by Thread A. Block 328 then reads requested information from Thread A. Finally, block 330 sends the read information to the client, along with codes indicating the success or failure status of the command C. This completes the description of Thread B.

Execution of Thread C

FIG. 16, Thread C enables controller 30 to notify the computer user's client program if an exceptional condition occurs, using a well-known callback mechanism. Block 340 loops indefinitely, waiting for Thread A to raise an exception (see discussion of Thread A, block 314). Block 342 formulates a response to the condition and determines which client program to call, depending on client programs which have been registered through the API as eligible to receive callbacks. Finally, block 344 then calls the client's program to notify the computer user that an exception has occurred. This completes the discussion of Thread C.

Special Procedures

Figure 21:
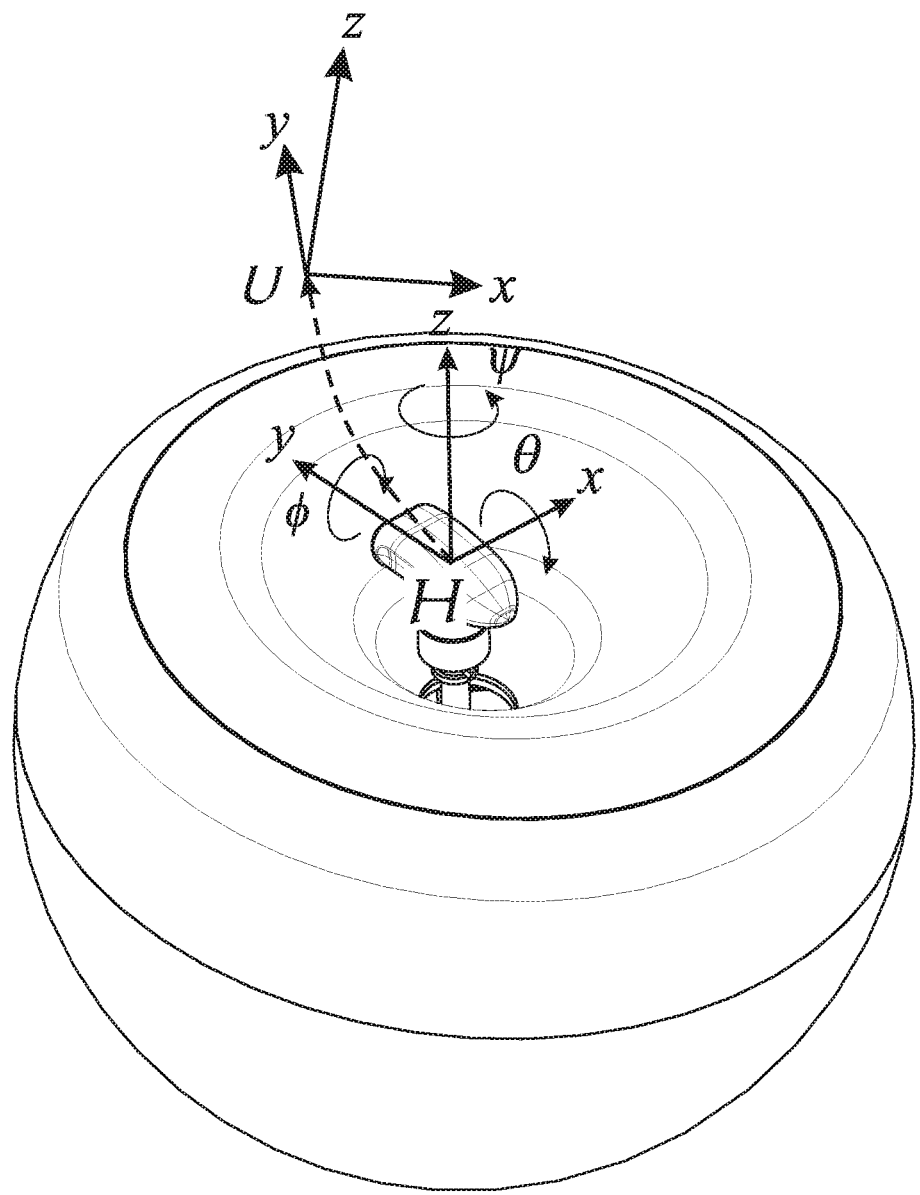
FIG. 21 shows a user coordinate frame translated and rotator from the handle coordinate frame.

FIG. 21 defines a user coordinate frame $\mathcal{U}$, which is arbitrarily translated and rotated from the default handle frame $\mathcal{H}$. In the usual case, $\mathcal{U}$ and $\mathcal{H}$ (are identical. The user frame can be specified by the computer user through the Application Programming Interface. Recall that the position and orientation of the handle frame $\mathcal{H}$ is determined by the forward kinematics solution executed in block 308 of Thread A shown in FIG. 16. If frame $\mathcal{H}$ is known, transformation to frame $\mathcal{U}$ is achieved by a well-known homogeneous transformation taking the form of a 4×4 matrix. On the other hand, the force-torque wrench through the handle is determined by the 6×6 actuation matrix A discussed in relation to block 312. This means, when $\mathcal{U}$ is not coincident with $\mathcal{H}$, the desired force-torque wrench is no longer exerted at the handle, but must be exerted through the origin of frame $\mathcal{U}$. This requires recomputing the geometric part G of the actuation matrix. The forces from each coil need only be rotated through the angles from frame $\mathcal{H}$ to frame $\mathcal{U}$, independent of the displacement between the two frames. On the other hand, the torques from each coil must be changed to reflect the changed moment arm from each coil to the origin of frame $\mathcal{U}$. That is, e.g., coil k will produce a force $f_k$ as well as a torque $\tau_k$ through the origin of $\mathcal{U}$ which is right angles to the force, and at right angles to a vector from the coil to the origin of $\mathcal{U}$. The total torque through $\mathcal{U}$ is then the vector sum of the individual coil torques.

FIG. 22A is a flow diagram illustrating a novel procedure executed by controller 30 for the purpose of taking flotor assembly 100 from a configuration resting against outer stator assembly 150 to the configuration where it is levitated at position and orientation (0,0,0,0,0,0), ready for haptic interaction. Block 350 sets the desired handle configuration $x_d=x$, where $x_d=(x_d, y_d, z_d, \theta_d, \phi_d, \psi_d)$ is the desired handle configuration and x=(x, y, z, θ, φ, ψ) is the current configuration. Block 352 calculates the distance from the current configuration to x=(0, 0, 0, 0, 0, 0), and divides by a large number N to obtain a small configuration increment $\delta_d$. Block 354 increments the desired configuration $x_d$ by $\delta_d$ during each iteration of the loop in Thread A shown in FIG. 16, slowly moving the flotor assembly according to the PD control law previously discussed in reference to FIG. 16, Thread A, block 310. In block 356, the desired position $x_d$ is compared with the desired final position x=(0, 0, 0, 0, 0, 0) to see if it is less than a small number ε. If the test is satisfied the procedure ends in block 358, when the flotor assembly will be stably levitated at the origin of laboratory frame $\mathcal{O}$.

Similarly, FIG. 22B is a flow diagram for landing flotor assembly 100 on outer stator assembly 150 in the configuration x=(0, 0, $z_d$, 0, 0, 0), where $z_d$ is a position value slightly lower than the bottom of the flotor assembly's range of travel in z. Block 360 sets the desired handle position $x_d$ to 0's, except for the z position, which is set to z=$z_d$. Block 362 calculates the distance from the current configuration and divides by a large number N to obtain a small configuration increment $\delta_d$. Block 364 increments the desired configuration $x_d$ by $\delta_d$ during each iteration of the loop in Thread A shown in FIG. 16, slowly moving the flotor assembly downward into the landing configuration according to the PD control law previously discussed in reference to FIG. 16, Thread A, block 310. In block 366, the z coordinate from successive iterations are compared to see if the flotor assembly is no longer moving and has come to rest against outer stator assembly 150 within a small tolerance $\epsilon^1$. If the test is satisfied the procedure ends in block 368, when the flotor assembly will be left resting against the inner surface of the outer stator assembly.

FIG. 23 shows a procedure for automatically finding the direction and magnitude of the gravity vector. For example, If device 20 is re-oriented in its work surface (see FIG. 1D), the previous feed-forward gain set 6-vector $K_f$ may not correctly act to cancel gravity. This means the PD control law discussed in relation to FIG. 16, Thread A, block 310, will have position and angle errors in all six degrees of freedom x=(x, y, z, θ, φ, ψ). These errors can be canceled with the algorithm shown in FIG. 23. In block 370, the average position and orientation 6-vector x is computed by summing over N loops of execution Thread A shown in FIG. 16, where N=50 is nominal. In block 372, the position and orientation error 6-vector δx from the desired value $x_d$ is computed. Next, in block 374, the 6-vector of feed-forward control gains $K_f$ is incremented by a small amount proportional to the error δx, causing the flotor assembly to move. After waiting for several ms as shown in block 376 for motion to settle, a test is made in block 378 to determine if the error is less than a small pre-defined amount ε. The procedure iterates until finishing in block 380, when gravitational forces and torques are canceled.

The invention claimed is:

1. A magnetic levitation haptic interface system comprising:
   (a) a movable levitated part having a substantially hemispherical shape and having at least one wire coil and a stationary part having at least one permanent magnet, wherein said at least one coil is immersed in the field of said at least one permanent magnet;
   (b) said levitated part having composite structure providing low mass and high mechanical stiffness, incorporating viscoelastic adhesive providing high mechanical damping, and a conductive layer providing electrodynamic damping;
   (c) at least one optical beacon affixed to said levitated part in active juxtaposition with at least one stationary optical position sensor, thereby providing the position and orientation of said levitated part;
   (d) a handle attached to said levitated moving part;
   (e) control means for reading the position and orientation of said levitated part, thereby providing position and orientation of said attached handle manipulated by a person to a computer; and for applying electric current to at least one said coil, thereby providing force as well as torque feedback output from a computer to said attached handle and thence to the person's hand;
   whereby a person can interact with a computer while feeling forces and torques in his or her hand.

2. The haptic interface according to claim 1 wherein said handle is mechanically attached and electrically connected to said levitated part by means operable in reverse to unattach and unconnect said handle.

3. The haptic interface according to claim 2 wherein said handle has a shape and function selected from the group consisting of computer mouse, writing pen, joystick, and grasping type.

4. The haptic interface according to claim 2 wherein said handle has at least one button operating at least one switch operable by a person.

5. The haptic interface according to claim 2 wherein said handle has the form of said grasping type handle incorporating means for measuring a person's thumb and forefinger separation in combination with means for applying a programmable force between a person's thumb and forefinger.

6. The haptic interface according to claim 5 wherein said grasping type handle incorporates position sensing means selected from the group consisting of potentiometer, capacitor, and inductor; and with force production means selected from the group consisting of rotary electric motor, and linear electric motor; and with transmission means selected from the group consisting of rack and pinion, friction drive, belt drive, and band drive.

7. The haptic interface according to claim 5 wherein said grasping type handle incorporates position sensing means selected from the group consisting of potentiometer, capacitor, and inductor; and with linear electric motor force production means and without transmission means.

8. The haptic interface according to claim 1 having a substantially spherical outer enclosure, permitting manual rotation of the combination of said levitated and said stationary part through any angle; thereby accommodating a person's preferences.

9. The haptic interface according to claim 8 wherein said combination of said levitated part and said stationary part are housed within a substantially spherical enclosure, in combination with a tabletop having a circular hole whose diameter is smaller than the diameter of said enclosure; thereby permitting passive support and manual rotation through any angle.

10. The haptic interface according to claim 1 wherein said at least one coil in said levitated part has substantially spherical shape.

11. The haptic interface according to claim 1 wherein said at least one coil is fashioned of thin insulated aluminum ribbon.

12. The haptic interface according to claim 1 wherein said control means is connected by cables with said combination of said levitating and said stationary part, whereby said control means can be located remotely from said combination of said levitating and said stationary part.

13. The haptic interface according to claim 1 wherein said control means incorporates a procedure for automatically lifting said levitated part against gravity and automatically landing said levitated part.

14. The haptic interface according to claim 1 wherein said control means incorporates a procedure for automatically detecting the magnitude and direction of gravitational forces and torques on said levitated part using said at least one optical position sensor and automatically canceling said forces and torques by the application of current in said at least one coil.

\* \* \* \* \*